(12) United States Patent
Conner et al.

(10) Patent No.: US 8,402,058 B2
(45) Date of Patent: Mar. 19, 2013

(54) METHOD AND COMPUTER PROGRAM PRODUCT FOR GEOPHYSICAL AND GEOLOGIC DATA IDENTIFICATION, GEODETIC CLASSIFICATION, ORGANIZATION, UPDATING, AND EXTRACTING SPATIALLY REFERENCED DATA RECORDS

(75) Inventors: John Conner, Houston, TX (US); Bruce Meadours, New Braunfels, TX (US); Bruce Ponton, late of, Austin, TX (US); Michael Ponton, legal representative, Austin, TX (US)

(73) Assignee: Ensoco, Inc., Houston, TX (US)

( * ) Notice: Subject to any disclaimer, the term of this patent is extended or adjusted under 35 U.S.C. 154(b) by 197 days.

(21) Appl. No.: 12/686,771

(22) Filed: Jan. 13, 2010

(65) Prior Publication Data

US 2010/0179963 A1    Jul. 15, 2010

Related U.S. Application Data

(60) Provisional application No. 61/144,263, filed on Jan. 13, 2009.

(51) Int. Cl.
*G06F 17/00* (2006.01)
*G06F 17/30* (2006.01)

(52) U.S. Cl. ........ 707/788; 707/736; 707/758; 707/769; 707/776; 707/803

(58) Field of Classification Search .................. 707/602, 707/694, 705, 715, 736, 758, 769, 776, 788, 707/803–804
See application file for complete search history.

(56) References Cited

U.S. PATENT DOCUMENTS

| | | | | |
|---|---|---|---|---|
| 5,515,534 A * | 5/1996 | Chuah et al. | ................. | 707/695 |
| 5,659,742 A * | 8/1997 | Beattie et al. | ......................... | 1/1 |
| 5,768,828 A * | 6/1998 | Wilson | ............................ | 49/386 |
| 6,216,131 B1 * | 4/2001 | Liu et al. | ............................... | 1/1 |
| 6,308,177 B1 * | 10/2001 | Israni et al. | ................... | 701/208 |
| 6,636,802 B1 * | 10/2003 | Nakano et al. | ............... | 701/532 |
| 6,643,644 B1 * | 11/2003 | Furusho | .............................. | 1/1 |
| 6,850,161 B1 * | 2/2005 | Elliott et al. | ............... | 340/572.1 |
| 6,851,087 B1 * | 2/2005 | Sibert | .......................... | 715/236 |
| 7,729,658 B2 * | 6/2010 | Euler | .............................. | 455/39 |
| 2003/0004874 A1 * | 1/2003 | Ludwig et al. | ................. | 705/40 |

(Continued)

FOREIGN PATENT DOCUMENTS

EP    0 838 663 A2    4/1998

(Continued)

OTHER PUBLICATIONS

Imran R. Mansuri et al. "Integrating unstructured data into relational databases",Proceedings of the 22nd International Conference on Data Engineering (ICDE'06), 12 pages.*

(Continued)

*Primary Examiner* — Srirama Channavajjala
(74) *Attorney, Agent, or Firm* — Carr LLP

(57) ABSTRACT

A method of geodetic information acquisition and a computer program product having computer code for performing the method are provided. The method includes identifying a file having multiple records, where the records contain spatially referenced data. The records are classified into header records and data records. Each data record is divided into fields. Patterns of fields consistent with sets of the data records are identified. The records are associated with a format based on the patterns of fields. At least some of the spatially referenced data is extracted from the records according to the format.

35 Claims, 17 Drawing Sheets

U.S. PATENT DOCUMENTS

| | | | |
|---|---|---|---|
| 2004/0076344 A1* | 4/2004 | Albertelli et al. | 382/305 |
| 2005/0273708 A1* | 12/2005 | Motyka et al. | 715/515 |
| 2006/0171339 A1* | 8/2006 | Euler | 370/299 |
| 2006/0197763 A1* | 9/2006 | Harrison et al. | 345/441 |
| 2006/0224995 A1* | 10/2006 | Treibach-Heck et al. | 715/816 |
| 2008/0162407 A1* | 7/2008 | Bolton et al. | 707/1 |
| 2010/0017123 A1* | 1/2010 | Dropps et al. | 701/212 |
| 2010/0023515 A1* | 1/2010 | Marx | 707/6 |
| 2010/0179963 A1* | 7/2010 | Conner et al. | 707/769 |

FOREIGN PATENT DOCUMENTS

| | | |
|---|---|---|
| EP | 1 134 674 A1 | 9/2001 |
| WO | WO 01/75672 * | 10/2001 |
| WO | WO 2009/058390 * | 5/2009 |

OTHER PUBLICATIONS

M. Gargano et al., "A Logical Data Model for Integrated Geographical Databases" 1990 IEEE, pp. 473-481.*

PCT/US2010/020900; International Search Report and Written Opinion of ISA; ISA/EP; May 3, 2010.

* cited by examiner

*FIG. 23*

METHOD AND COMPUTER PROGRAM PRODUCT FOR GEOPHYSICAL AND GEOLOGIC DATA IDENTIFICATION, GEODETIC CLASSIFICATION, ORGANIZATION, UPDATING, AND EXTRACTING SPATIALLY REFERENCED DATA RECORDS

CROSS-REFERENCE TO RELATED APPLICATIONS

This application relates to, and claims the benefit of the filing date of, co-pending U.S. provisional patent application Ser. No. 61/144,263 entitled METHOD AND APPARATUS FOR GEOPHYSICAL AND GEOLOGIC DATA IDENTIFICATION, GEODETIC CLASSIFICATION, AND ORGANIZATION, filed Jan. 13, 2009, the entire contents of which are incorporated herein by reference.

TECHNICAL FIELD

The present invention relates to geodetic information acquisition, and, more particularly, geodetic information acquisition from a group of geodetically related data files of unspecified and possibly diverse formats.

BACKGROUND

Spatially referenced data is commonly used in the oil and gas industry and other geophysical and geologic industries. Vast quantities of spatially referenced data are continually sold, bought, exchanged, and managed by oil and gas companies, geophysical and geologic data brokers, and data managers.

Spatially referenced data includes, for example, geophysical seismic data and geologic well data. Spatially referenced data may define (1) a subject, such as seismic data or well data, and (2) a location of the subject with respect to the Earth. The usefulness of spatially referenced data may depend on being able to identify the subject and the location. Further, determining coordinates for the data may be insufficient to determine the location, because there are many different systems, or datums, of latitude and longitude and projections of eastings and northings.

Some types of information which may be needed in meaningfully organizing and utilizing coordinate data include coordinate identities, geodetic identity, projection identity, and coordinate reference system parameters.

"Coordinate identities" imply either geographic coordinate reference systems (latitudes and longitudes) or projected coordinate reference systems (eastings and northings; aka X and Y values). The association of a coordinate identity with a set of coordinates is known as "geodetically classifying" the coordinates.

"Geodetic identity" is the metadata (being document data about data elements or attributes and data about records or data structures) which describes what system of coordinates are being used (e.g. North American datum of 1927 vs. World Geodetic System of 1984) and refers to latitude, longitude.

"Projection Identity" is used for easting and northings, and it would be the metadata which describes those (e.g. Universal Transverse Mercator Zone 16 vs. Louisiana South Lambert etc.).

"Coordinate reference system parameters" are those metadata which mathematically through provided parameters describe the various systems or which more accurately define systems which cannot be described explicitly by name such as North American Datum of 1927, World Geodetic System of 1984, Lambert State Plane Texas North or Universal Transverse Mercator Zone 15. Systems such as Transverse Mercator, Polyconic, Rectified Skew Orthomorphic, for instance, would need mathematic parameters with which to describe the coordinate identity.

Today, most spatially referenced data is stored electronically in defined file formats. Many file formats, such as UKOOA, SPS, and WITSML, include both coordinate data and coordinate identities. However, many formats have minimal or no coordinate identity information, making those formats more difficult to organize and use. FIG. 1 shows a typical data file providing minimal geodetic identity. Manually locating spatially referenced data, identifying the subject of the data, identifying the location of the subject, including the coordinate identities, and organizing the data for subsequent usage is a people and time intensive task.

Additionally, spatially referenced data was often recorded and updated manually, making it subject to human error. As a result, data was sometimes stored in a form inconsistent with the file format. Attempting to use misleading spatially referenced data can create many problems. For example, suppose correct seismic data was mistakenly associated with an incorrect system of reference. The seismic data may show a favorable probability of oil and gas in one area. However, because of the incorrect system of reference, the seismic data may be misinterpreted to show a different area nearby. FIG. 2 is a cartoon showing the impact of poorly or incorrectly referenced coordinates. The misinterpretation could cause significant loss of revenue, legal and ownership issues, environmental impact, and health and safety issues.

Properly organized and properly classified coordinate data yields many useful results. First, the coordinate data may be readily viewed on a mapping system or a graphical information system (GIS). FIG. 3 shows an example of seismic coordinate events posted on a map in the proper datum and projection versus the same data posted when improperly classified. Resulting comparisons indicate mislocation of approximately 400 feet. Second, the coordinate data may be quickly reprojected into another datum or projection. Third, the coordinate data may be translated into different formats and structures, such as WITSML, UKOOA, SPS, and SEG. Fourth, files and data that cannot readily be identified may become accessible to forensic analysis using other geodetic methods and tools. FIG. 4 shows well location data mapped with aerial imagery allowing the coordinate values to be compared to ground truth. Fifth, files may be grouped into geographic, project, or other archival schema methods. FIG. 5 shows an example of coordinate data files classified in such a manner. Sixth, unorganized data may be grouped in such a manner as to allow coordinate data to be loaded into industry processing systems, geospatial databases, and other systems requiring data in a geodetically identified and organized structure.

Thus, a need exists for automated identification and organization of spatially referenced data. A solution may lead to more accurate and more detailed descriptions of geophysical and geologic data, which in turn may lead to more effective location of minerals such as oil and gas.

SUMMARY OF THE INVENTION

Accordingly, a method for geodetic information acquisition is provided in one exemplary embodiment of the present invention. The method includes identifying a file, where the file includes multiple records having at least some spatially referenced data. The records are classified into one or more header records and one or more data records. Each data record is divided into multiple fields. One or more patterns of fields consistent with the one or more sets of data records are identified. The records are associated with a format based on the one or more patterns of fields. At least some of the spatially referenced data is extracted from the records according to the format.

A computer program product for geodetic information acquisition is provided in another exemplary embodiment of the present invention. The computer program product includes at least computer code for performing the exemplary method for geodetic information acquisition.

DESCRIPTION OF DRAWINGS

For a more complete understanding of the present invention and the advantages thereof, reference is now made to the following Detailed Description taken in conjunction with the accompanying drawings, in which:

FIG. 23 shows an example of explicitly defined header records.

DETAILED DESCRIPTION OF THE INVENTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, specific details, and the like have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or as software instructions for enabling a computer to perform predetermined operations, where the software instructions are embodied on a computer readable storage medium, such as RAM, a hard drive, flash memory or other type of computer readable storage medium known to a person of ordinary skill in the art. In certain embodiments, the predetermined operations of the computer are performed by a processor such as a computer or an electronic data processor in accordance with code such as computer program code, software, and, in some embodiments, integrated circuits that are coded to perform such functions.

Disclosed is a method and computer program product for automated identification and organization of spatially referenced data in accordance with the present invention. The present invention transforms unorganized and less reliable representations of spatially referenced phenomena into organized and more reliable representations of the phenomena. From the present invention, more accurate and reliable geophysical and geologic predictions and maps can be formed.

Figures 1, 2:
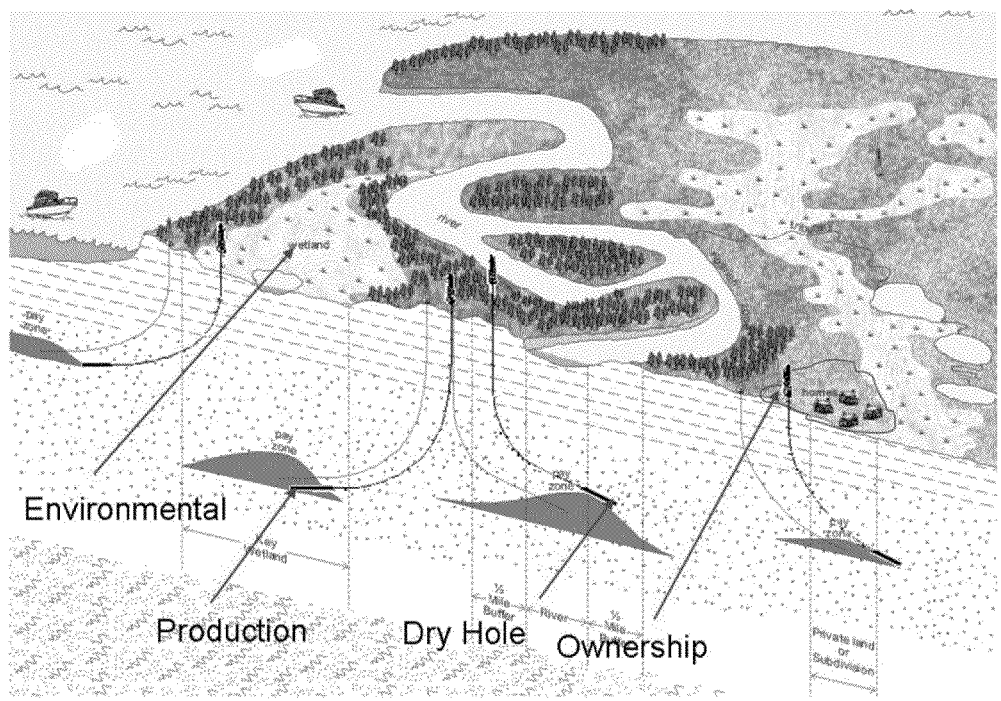
FIG. 1 is an example of a non-standard file with minimal geodetic identity.
FIG. 2 is a cartoon example of the impact of poorly or incorrectly referenced coordinate data.
Figure 3:
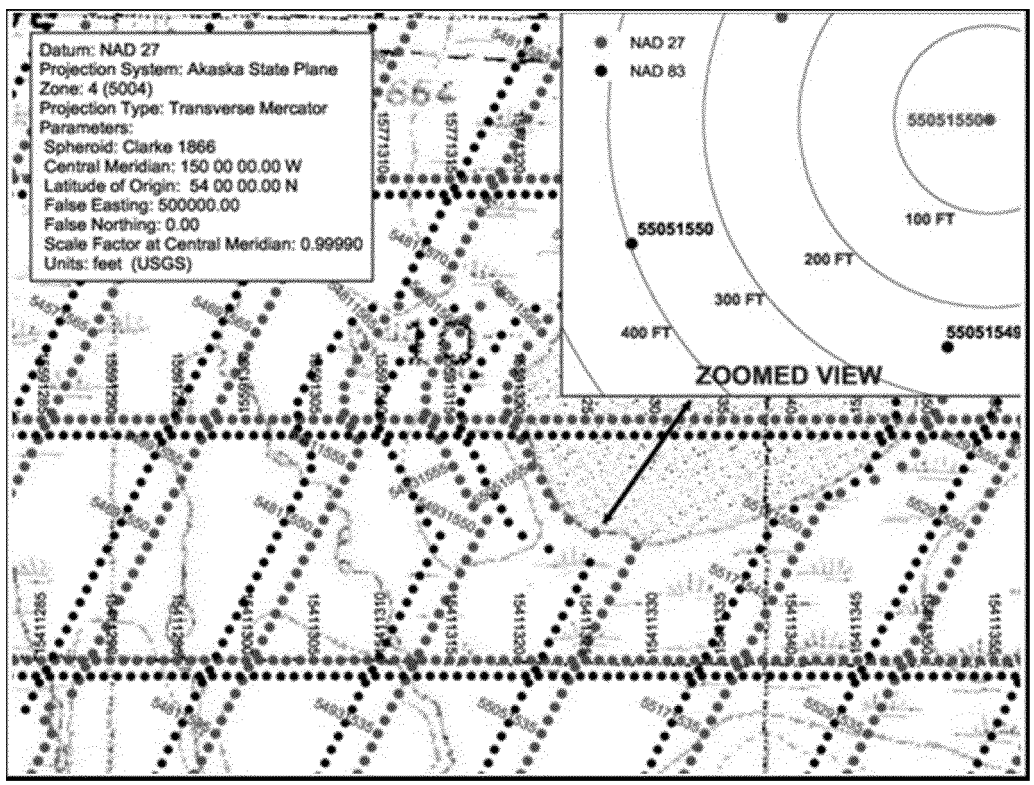
FIG. 3 is a map view of seismic data mapped correctly and incorrectly based on correct and incorrect geodetic classification.
Figure 4:
FIG. 4 is a GIS tool showing high resolution satellite imagery used to validate correctly, incorrectly and unknown well location coordinates.
Figure 5:
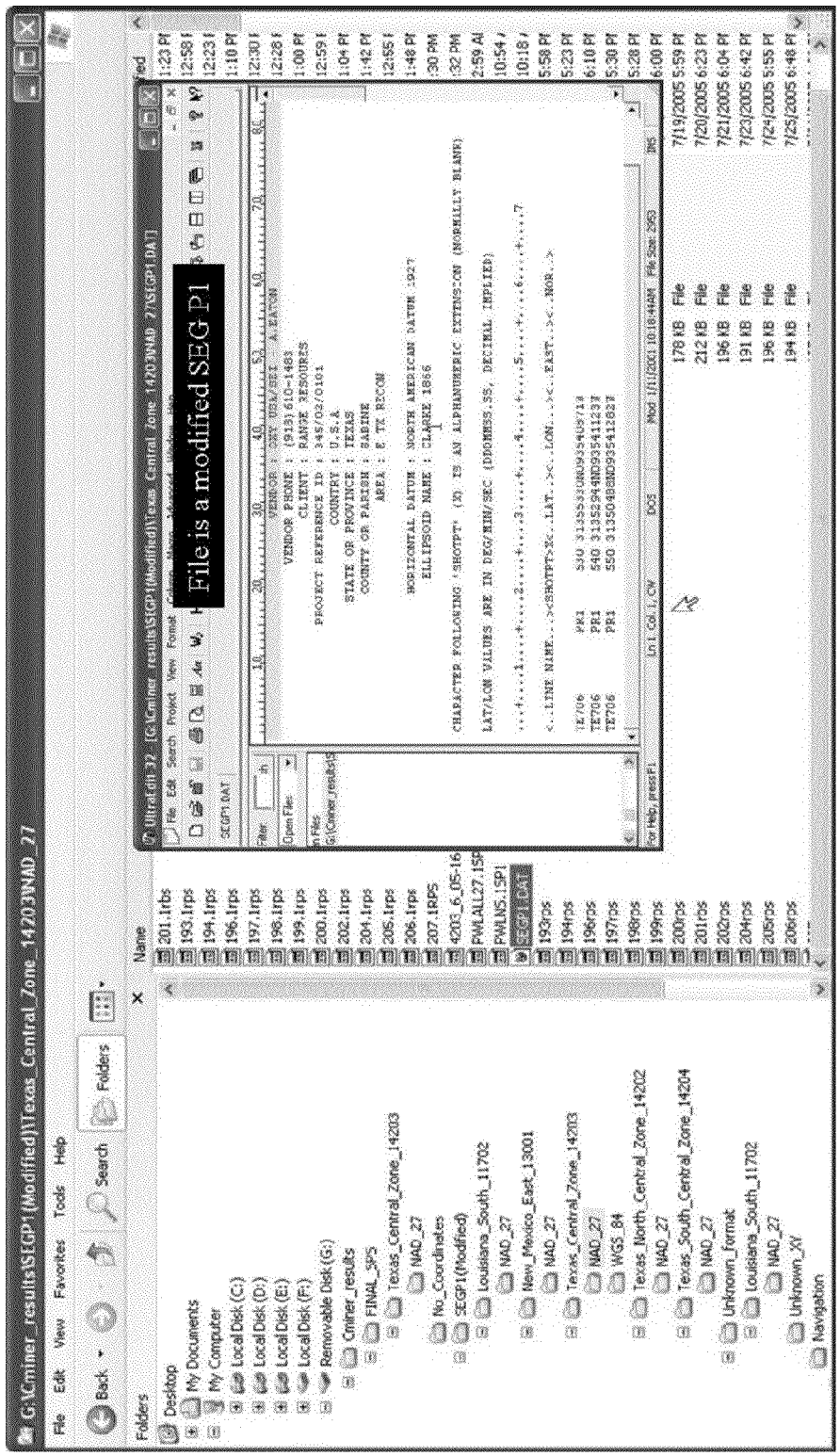
FIG. 5 is an example of files containing coordinate data grouped by recording format and geodetically classified within format.
Figure 6:
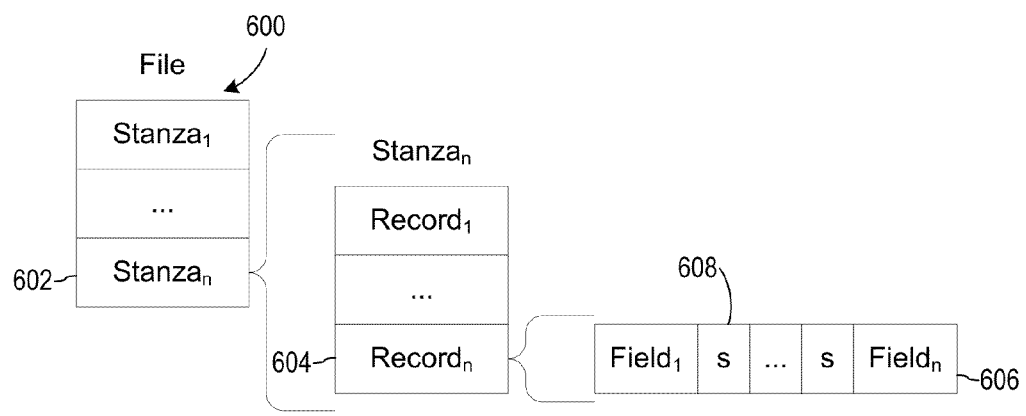
FIG. 6 is a diagram of the data record portion of multiple stanzas within a data file.

To identify and organize data files, the present invention may assume every relevant data file follows an abstract model. Referring to FIG. 6, depicted is an abstract data file 600 in accordance with an embodiment of the present invention. File 600 may be a text file containing representations of spatially referenced phenomena. File 600 may comprise one or more stanzas 602. A stanza 602 may be a collection of one or more records 604 composed of data records all in the same format and header records associated with those data records.

A record 604 may be a line of text in file 600. A record 604 may be divided into one or more fields 606 separated by separators 608. Each field 606 may contain a discrete piece of information in the file 600. For example, a field may contain a value or a keyword identifying the meaning of a value.

A separator 608, denoted by a lowercase "s" for reference, may be any of a number of characters or combinations of characters indicating the end of one field and the beginning of another. Separators may include commas and blank spaces. In certain record formats, discussed later, there may be no separators between fields. In these formats, the sizes of the fields may be used to determine the end of one field and the beginning of another.

Figure 7:
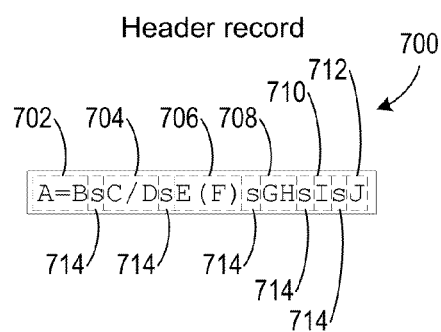
FIG. 7 is a diagram of an abstract header record.
Figure 8:
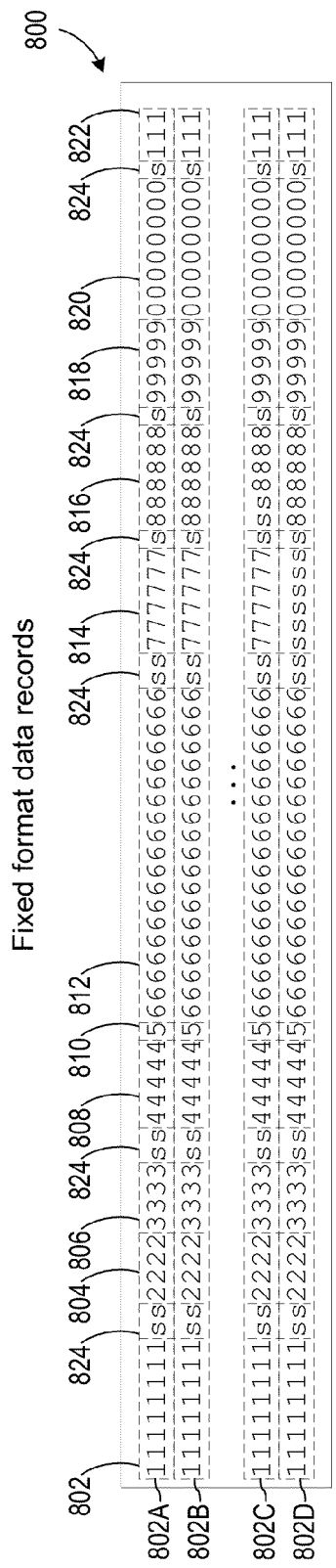
FIG. 8 is a diagram of multiple abstract fixed format data records.
Figure 9:
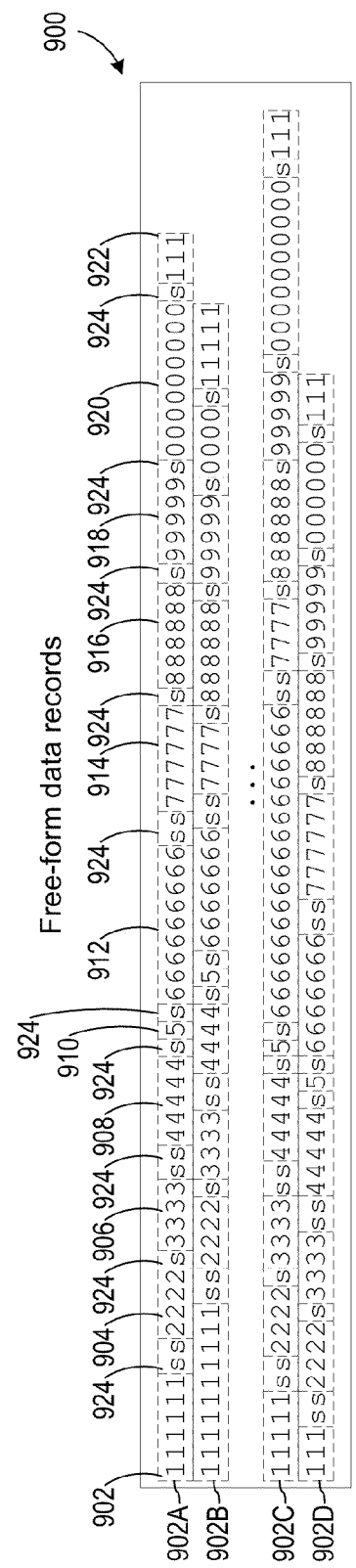
FIG. 9 is a diagram of multiple abstract free-form data records.

In FIGS. 7, 8, and 9, fields and separators are shown separated by dashed lines for reference.

A record 604 may be either a header record or a data record. Data records may represent specific individual data points, such as an individual point of seismic data. Header records may contain data applicable to multiple data records, such as the geographic region to which the information in multiple data records corresponds.

Referring to FIG. 7, depicted is an abstract header record 700 in accordance with an embodiment of the present invention. Header record 700 includes fields 702, 704, 706, 708, 710, and 712 separated by separators 714. Each of fields 702, 704, 706, and 708 contains a keyword and a value assigned to that keyword. The keywords are respectively denoted by "A", "C", "E", and "G". The values are respectively denoted by "B", "D", "F", and "H". In fields 702, 704, and 706, assignment characters are used to separate the keyword and value. These assignment characters are "=" for field 702, "I" for field 704, and "("and")" for field 706. In field 708, no assignment character is used and keyword G may be distinguished from value H by other means, such as identifying keyword G as a keyword based on its content.

Field 710 contains a keyword denoted by "I" and field 712 contains a value for that keyword denoted by "J". The keywords are separated by a separator, rather than an assignment character. Field 710 may be identified as associated with field 712 by other means, such as the absence of an assignment character in both fields and the position of the fields near one another.

An actual header record may contain one or more of the forms for associating a keyword with a value in header record 712. Appendix A contains examples of header records.

Data records may be one of two types, fixed format and free-form. A fixed format data record may be defined as a data record in which the fields are limited to fixed columns and sizes. Thus, the size of the fields, in addition to any separators, may be used to determine where one field ends and another field begins in a fixed format data record. A free-form data record may be defined as a data record in which the fields are not limited to fixed columns and sizes. Separators may be used to determine where one field ends and another field begins in a free-form data record.

Referring to FIG. 8, depicted is a set of abstract fixed format data records 800 in accordance with an embodiment of the present invention, including data records 802A, 802B, 802C, and 802D. Each data record has fields 802, 804, 806, 808, 810, 812, 814, 816, 818, 820, and 822. Each of these fields must be uniform in length across all data records in the set 800. For example, field 802 must be eight characters long in data records 802A, 802B, 802C, 802D, and all other data records in the set 800. Separators 824 separate data records 802 and 804, 806 and 808, 812 and 814, 814 and 816, 816 and 818, and 820 and 822. Separators do not separate data records 804 and 806, 808 and 810, 810 and 812, and 818 and 820. These data records may be distinguished using their fixed lengths. For instance, the length of field 804 may be fixed at four characters, so the fifth character following the beginning of field 804 may be known to be the beginning of field 806.

In fixed format data records, a separator may separate fields, but may also indicate unused length in a field. For example, in record 802C field 804 is shown to be four characters long and preceded by two separators 824. However, if a data record has a three-character value for field 804, a separator character may be inserted before or after the value to occupy the space for the unused fourth character. This may be done because each field in a fixed format data record is required to be a uniform length.

Additionally, if, for example, a data record has no value for field 806, field 806 may contain only separators 824. Therefore, with reference only to that data record, the existence of field 806 may not be apparent. The existence of field 806 may be determined by comparing the data record to other similar data records where field 806 has a value. Field 814 in record 802D is an example of a fixed format record with a field with no value.

Referring to FIG. 9, depicted is a set of abstract free-form data records 900 in accordance with an embodiment of the present invention, including data records 902A, 902B, 902C, and 902D. Each data record has fields 902, 904, 906, 908, 910, 912, 914, 916, 918, 920, and 922. Unlike fixed-format data records, each field may vary in length in different data records. For instance, field 902 is six characters in length in data record 902A, ten characters in length in data record 902B, five characters in length in data record 902C, and three characters in length in data record 902D.

Separators 924 may separate each field from the subsequent field. Because the fields may vary in length, the length of a field may not be used to determine the end of the field. Therefore, separators 924 may be needed to determine where each field ends.

In both fixed format and free-form data records, each field is limited to a specific type of contents. For instance, some fields may be limited to digits, the plus sign ("+"), and the minus sign ("−"). The type of contents of each field may be used to identify the format of a set of data records. The following categories are used to define the possible types of contents of a field.

| | |
|---|---|
| Integer | A field that contains only digits, the plus sign ("+"), and the minus sign ("−"). |
| Real | A field which (1) is not in the integer category, (2) consists of only digits, the plus sign, the minus sign, a decimal point, an uppercase "E," and a lowercase "e" (exponential notations), and (3) has only one decimal point. |
| Long numeric | A field with contents that is in the integer or real number categories but (1) is longer than nine characters and/or (2) has greater than one decimal point is initially categorized as a Long numeric. This is a temporary classification and long numerics are subsequently re-classified as one or more fields of type Integer or Real. |
| Pn | A field that contains only special predefined forms for latitude and longitude (as defined in appendix B). Most of these consist of Integer or Real plus the letters N, S, E, W. |
| Alphanumeric | Any field not belonging to one of the above categories. |

If a field is categorized in the long numeric category, the field may potentially be multiple adjacent fields not divided by separators in the underlying file format. The long numeric field may be separated into the multiple fields if a consistent pattern indicates the long numeric represents multiple adjacent fields in the underlying file format.

Figure 10:
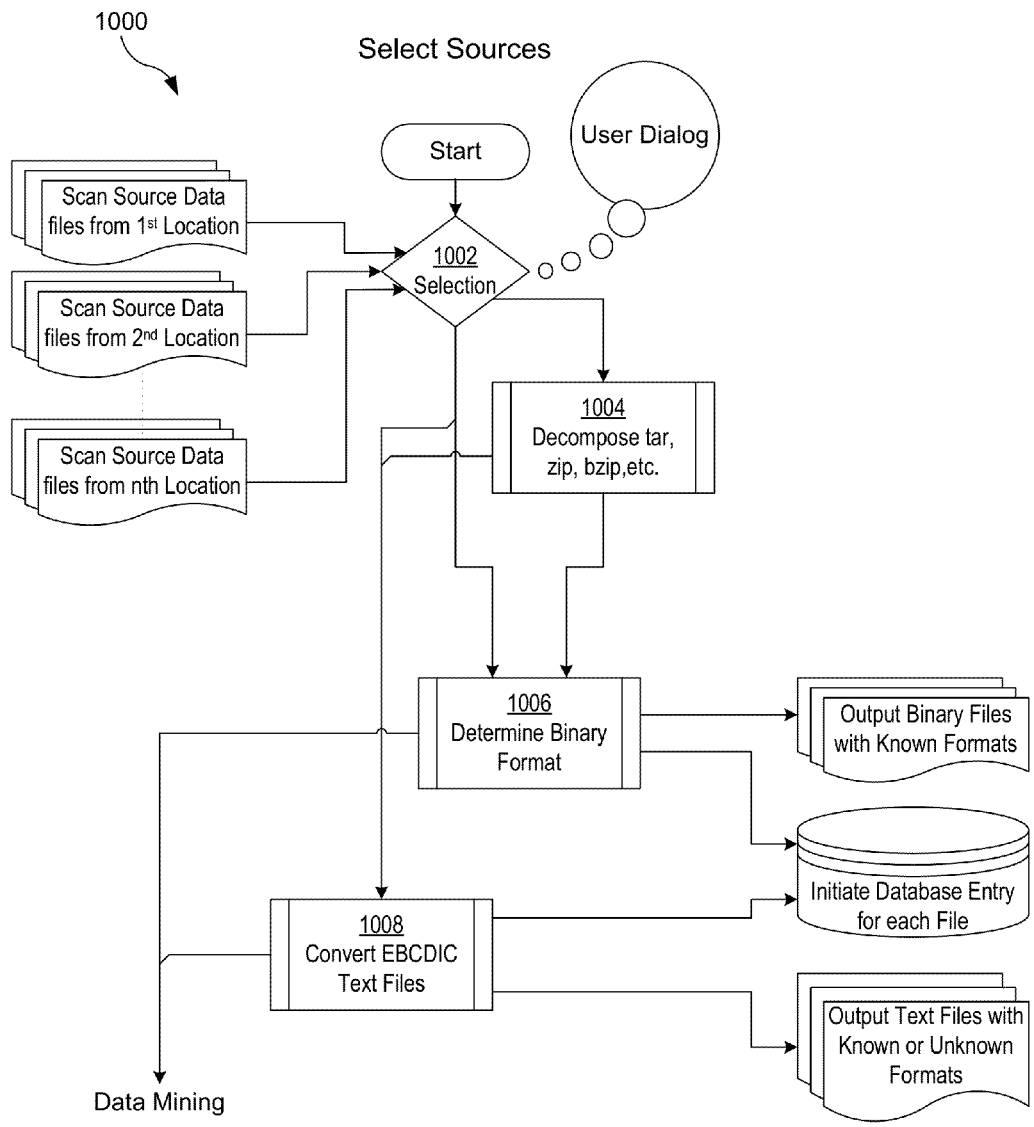
FIG. 10, also referred to as SELECT SOURCES, is a diagram of a method for automated identification and organization of spatially referenced data in accordance with an embodiment of the present invention.

Referring to FIG. 10, depicted is a process 1000 for automated organization and preparation of spatially referenced data in accordance with the present invention. The process 1000 begins at step 1002, where files which are potential sources of spatially referenced data may be added to a collection of files called a "project." The files may be identified, for example, as all files in one directory on a local drive or all files in all directories on a network that meet certain qualifications. Step 1002 determines on a file by file basis whether a file is encoded as TEXT or BINARY, or has been COMPRESSED.

Following Step 1002, the process 1000 continues to Step 1004. All compressed files may be decompressed using the appropriate decompression software. All decompressed files may be then examined to determine whether they are TEXT or BINARY.

Figure 11:
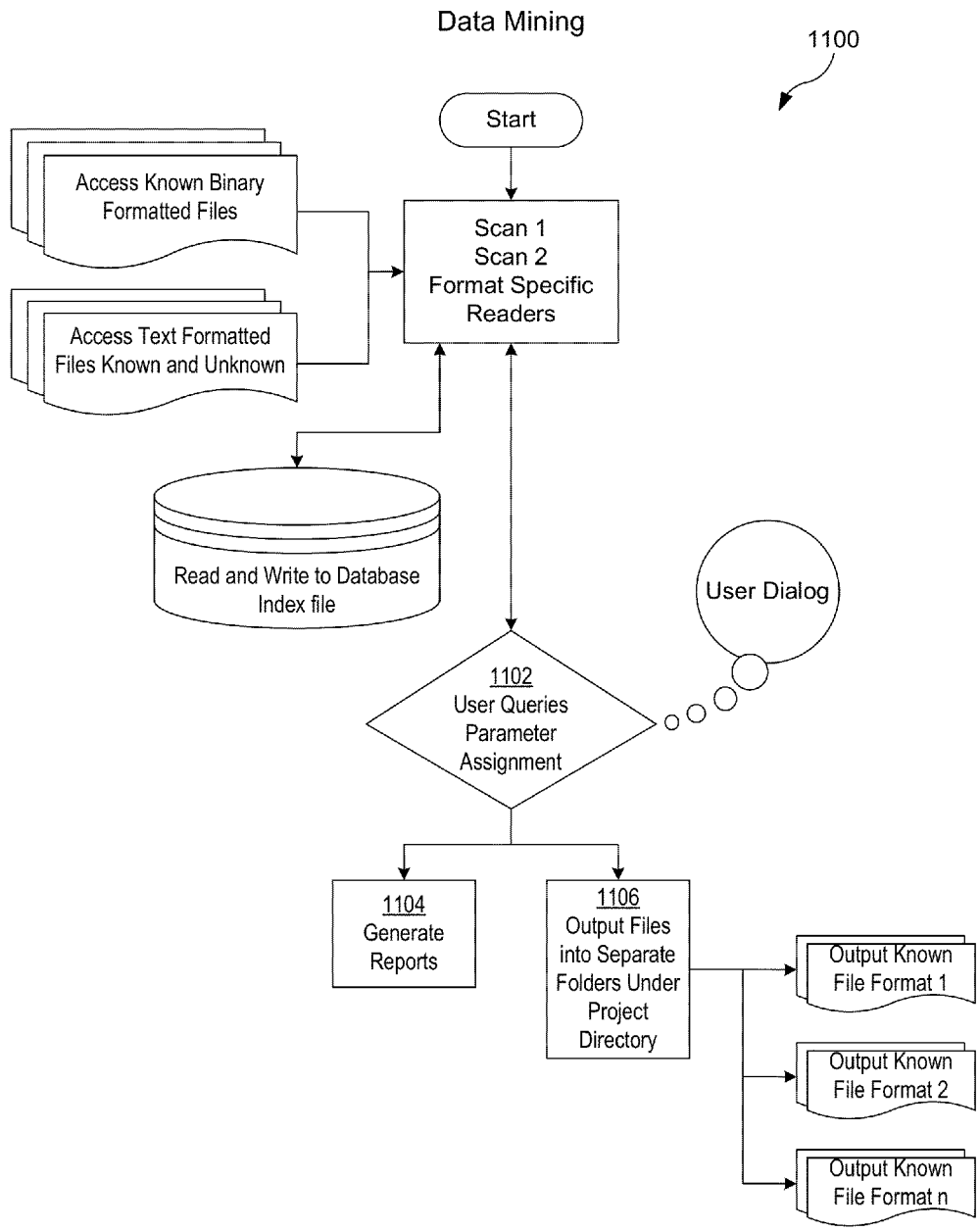
FIG. 11, also referred to as Data Mining, is a diagram of a method for automated extraction of information from data records in accordance with an embodiment of the present invention, and presents an overview of data mining.
Figure 12:
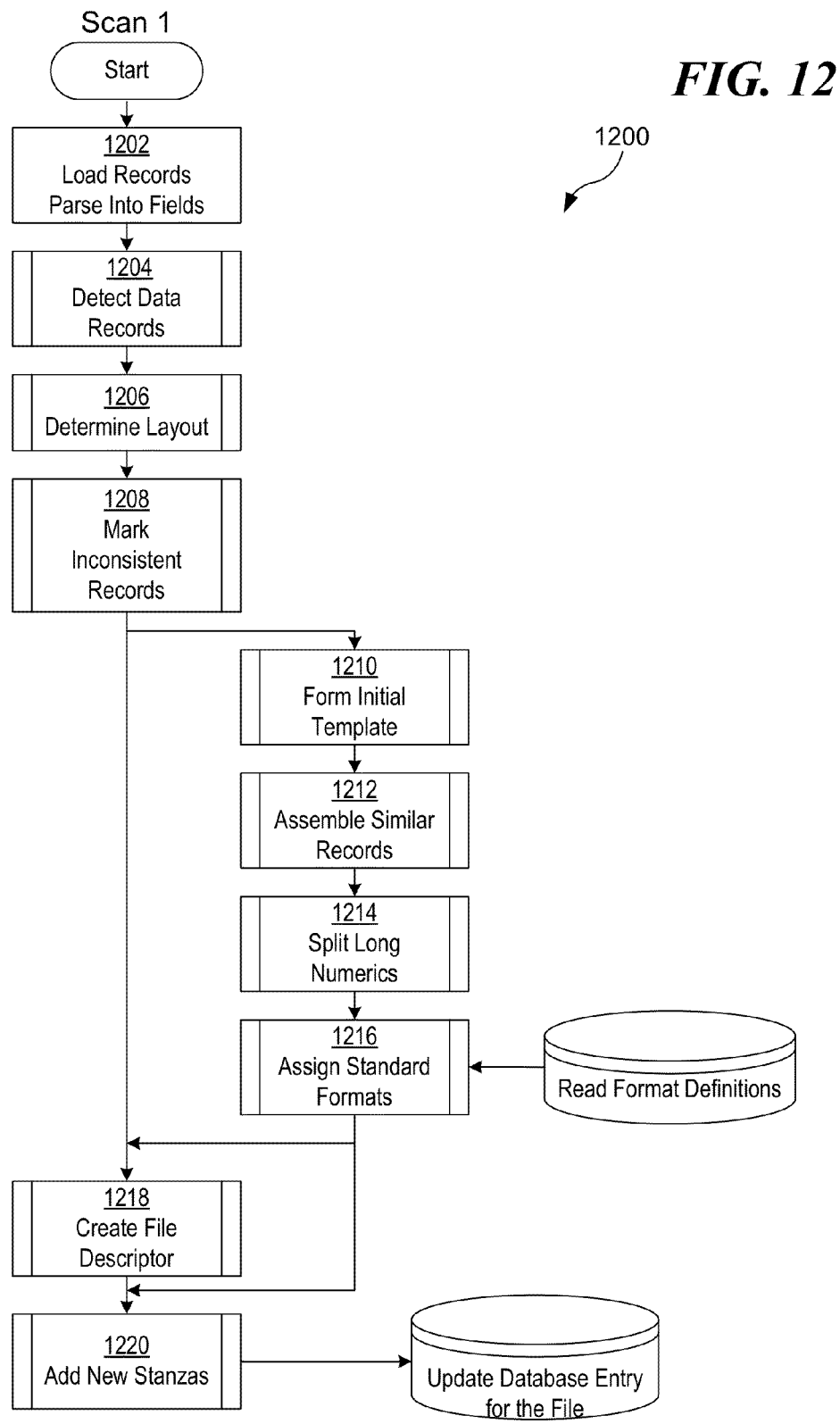
FIG. 12, also referred to as SCAN 1, is a diagram of a method for creating a template for the format of a set of fixed format data records in accordance with an embodiment of the present invention.
Figure 13:
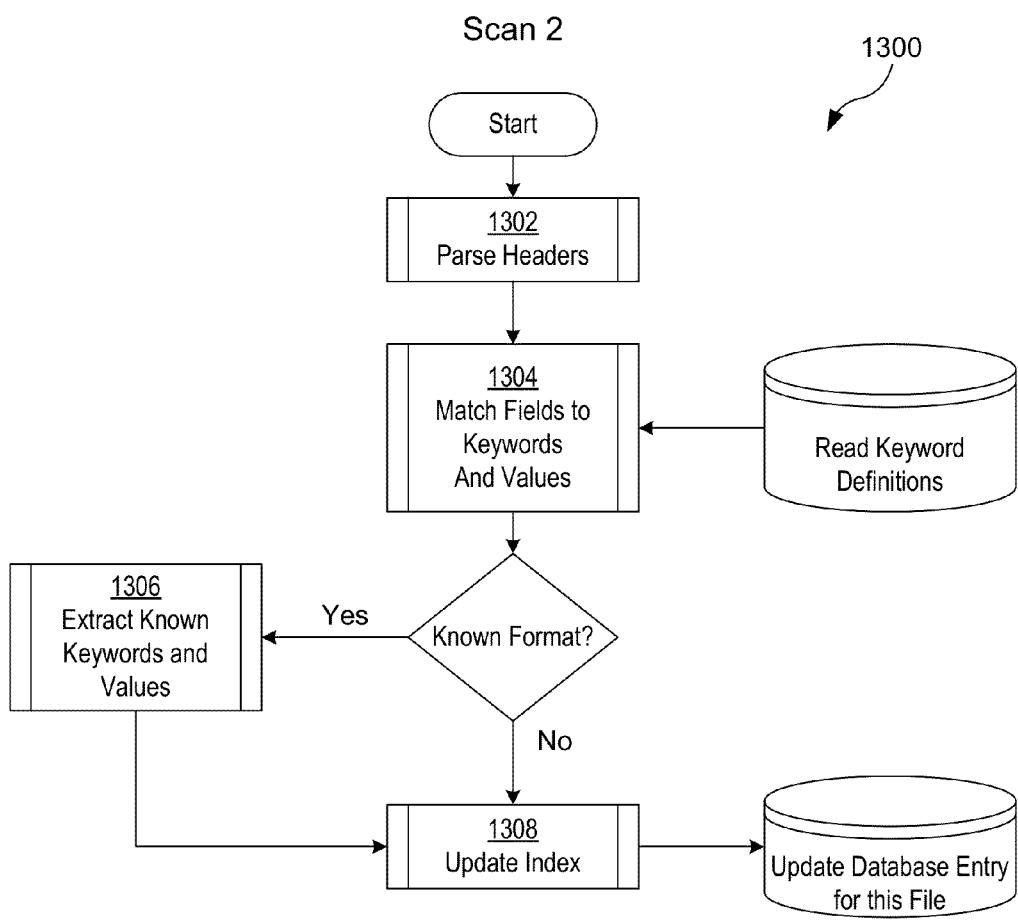
FIG. 13, also referred as SCAN 2, is a diagram of a method for automated extraction of information from header records in accordance with an embodiment of the present invention.

Following Step 1004, the process 1000 continues to Step 1006. All files that were determined to be binary are examined to determine if they are of a known or unknown format. Binary files are rejected only if they are not recognized as a known format. If recognized as SEG-D or SEG-Y, the files will be output to a special directory and initial entries are made in the database file. This is equally true of compressed files, EBCDIC (as indicated below) and files which have multiple headers, which are determined to be different; especially with respect to geodetic content. All the rest are only mined for content. Information is extracted from them using a special reader and equivalent entries are made into the database index file, as those produced by SCAN1 and SCAN2 on TEXT files (FIGS. 11 and 12). Following step 1006, the process continues to Step 1008. In step 1008, all Text files are examined to determine whether they are encoded in ASCII or EBCDIC. All Text files that are encoded in EBCDIC are converted to ASCII and placed in a special directory for input to SCAN 1 and SCAN 2 (FIGS. 12 and 13). All ASCII files are left in place for input to SCAN 1 and SCAN 2. Initial entries are made in the database index file for all Text files. Step 1008 finishes Process 1000 and the files are now ready for input to the data mining process.

Referring to FIG. 11, depicted is an overview of the Data Mining Process 1100. The data mining may allow a user to inventory and access large stores of historical data. The data in the source files may be presented to the user as reports, lists of groups of files that share a number of attributes. The database built from the Data Mining Process also facilitates the input of the source files into mapping or other visualization software to assist the user when manual classification is necessary.

Two processes, which may be labeled SCAN 1 and SCAN 2 for reference, may be performed on each file. In the SCAN 1 procedure, all records are parsed into fields that are classified into specific types. Each record is classified based on structure and content as fixed or free format. Using several steps detailed in FIG. 12 these records are further classified as data records or headers. An attempt is then made to identify the data records as one of a set of known standard formats based on the consistent content and structure of the data records. Otherwise, it is classified as Generic. This is also described in detail in FIG. 12. In the SCAN 2 procedure, information is extracted from header records using a flexible keyword matching approach. This process will be described in more detail with reference to FIG. 13. This process may be labeled SCAN 2 for reference.

For faster processing, the coordinate information in the index may be grouped by geodetic identity and format or data structure within geodetic identity. The grouping may allow more efficient processing and manipulation of the data. The application may allow the user to choose how the coordinate information should be grouped. The user may also regroup the coordinate information based on a different geodetic area or format within the area.

As an example, all files which are in the Minna Datum and Nigerian Mid-Belt Projection may need to be isolated from files which are in the WGS-84 Datum and the Nigerian Mid-Belt projection. Additionally, files in UKOOA P1/90 may need to be isolated from files in UKOOA P1/84 or SPS or UKOOA P7, and so on.

Figure 14:
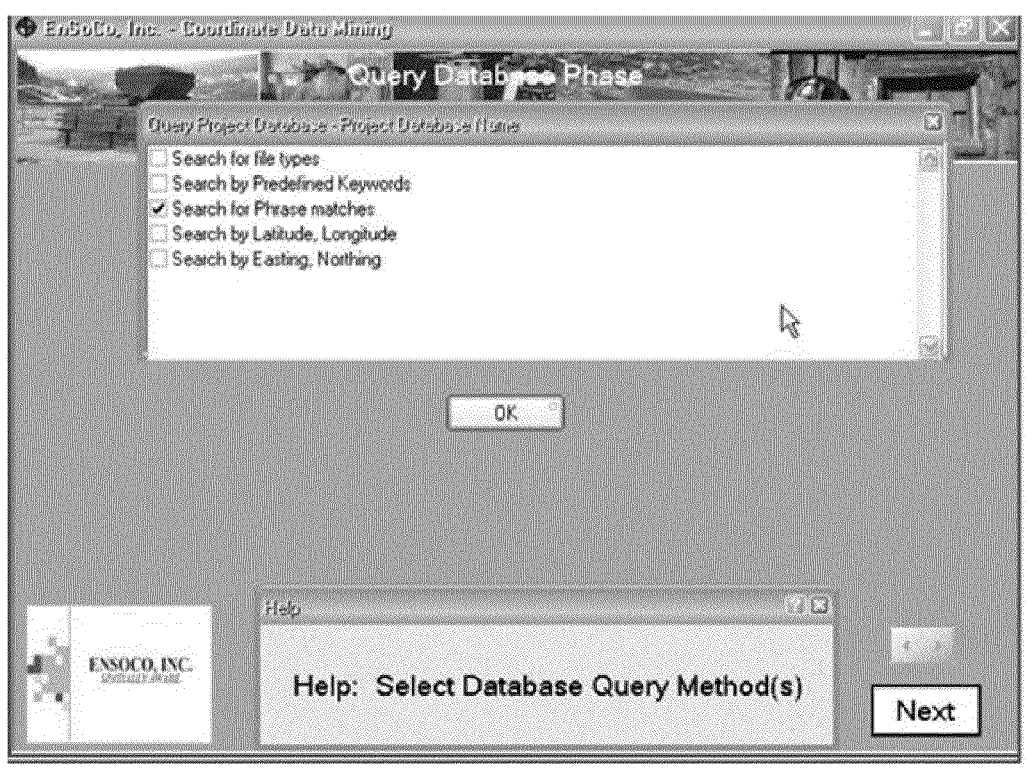
FIG. 14 is an example of search classifications following data mining.

The purpose of the data matching Scan 2 is to collect common information from many diverse files, formats, and storage locations for subsequent organization and processing. The user may manually assign additional parameters to groups of files. The user may specifically assign missing geodetic parameters. Following the first pass of the Scan 2 process, the user may evaluate the information based on resulting grading of keyword matches and as a result add new keywords to further classify the data. Scan 2 populates possible entries in the database; including keyword use to enable EPSG coding and naming, coordinate extents or boundaries and other information used in subsequent queries for file organization and classification. This information is shown in Appendix B—Data mining database. After Scan 1 and Scan 2 are completed the user may proceed to step 1102, a query application similar to a search engine. The user may query the index using the search criteria to identify data in terms of geodetic identity and file types. FIG. 14 is an example of this type of search classification.

Figure 15:
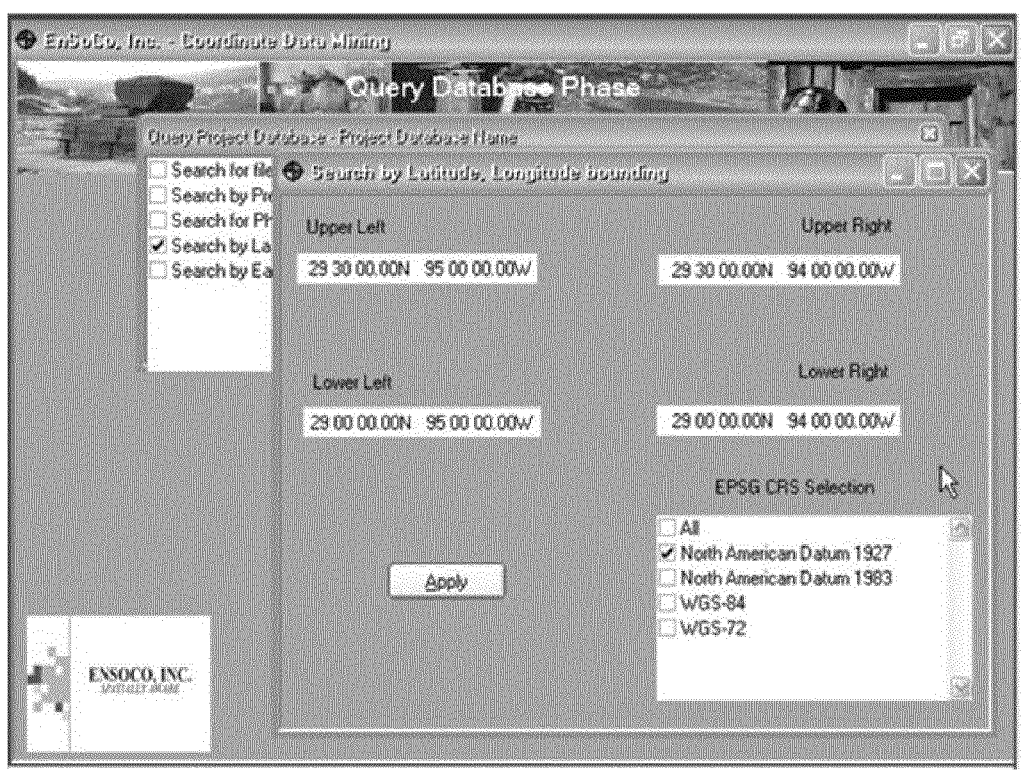
FIG. 15 shows an example of a geodetic search and is further defined by the EPSG keywords for Geodetic Identity.

Searches may be performed using matching based on information extracted during Scan 2 (FIG. 13). This information may be in highly structured formats using industry nomenclature as represented in various data models and geodetic naming conventions such as POSC, EPSG, and PPDM. Information representing geodetic identity such as datum names, projection and zone names, codes, units of measure, and other possible criteria are included as possible keywords used to perform graded matches for the information in the index. FIG. 15 shows an example of this type of search; where a geodetic search is further limited by the EPSG conventions for Geodetic Identity.

A technique may be employed to allow for phrase matching to help in the determination of geodetic identity. Many files contain partial or vague references to the geodetic identity of the coordinate. Many reference geographical areas such as country, state or province, county, city, or local physical reference such as lake, highway, or monument. Some references will be in partial geodetic nomenclature, such as ellipsoid, datum, or projection names. Through the use of predefined keywords (EPSG database nomenclature[1]) or user provided phrases, the query application can report on matches or partial matches within the information obtained through data mining.

[1] The EPSG database is maintained by The Organization of Oil and Gas Producers' Survey and Positioning Sub-Committee (www.ogp.org). It is a public repository of coordinate reference system names, descriptions, and defining parameters.

Figure 16:
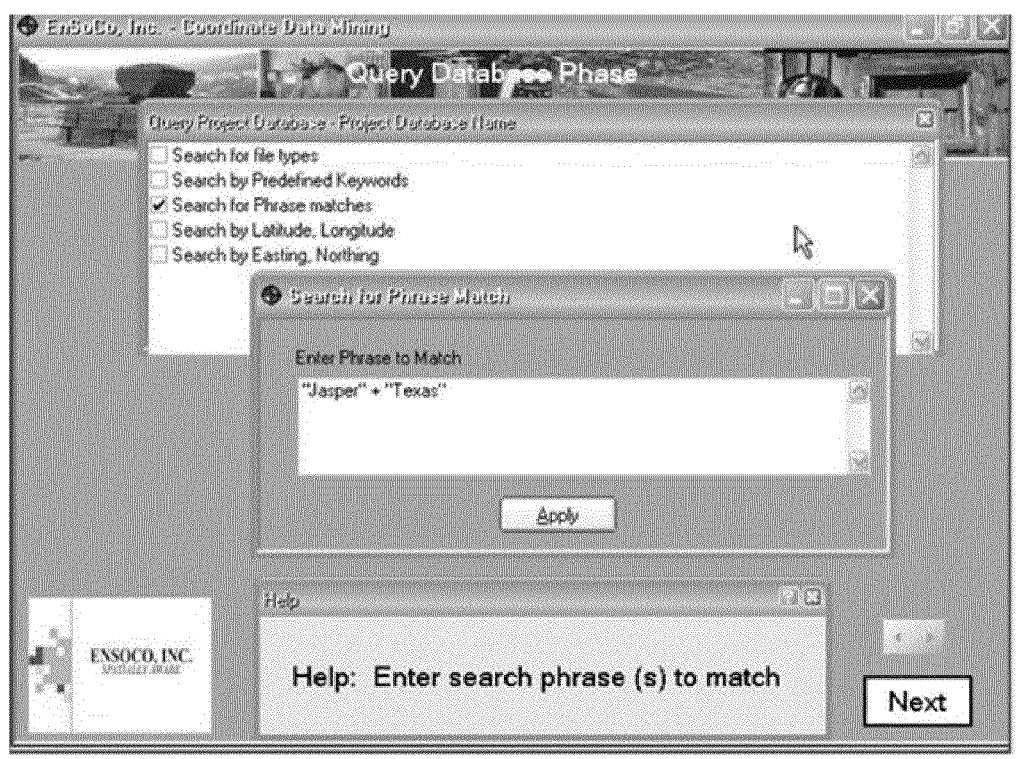
FIG. 16 is an example of a phrase search.

Knowing a country, state or province, ocean body, county, city or even a prospect name can isolate poorly, ill-defined or even not defined coordinates to a specific set of data and systems of coordinates for identification. The coordinates can be tested against these systems to identify them and classify them. The invention may not be attempting to solve the classification, but may collect sufficient information to enable it to be solved. FIG. 16 is an example where a phrase search allows the user to locate all files which might have coordinates in a particular county and state. While the header data or file name may not contain proper Coordinate Identity, the county and possibly state name may appear in either the file name or data file content.

Using keywords is especially useful in searching freeform headers for full or partial matches on textual strings which may describe some of the above. For example, matching on "Walker, County Texas" can minimize the number of possible systems from worldwide possibility to a manageable set of coordinate tests. By being able to do keyword searches during the Scan 2 process we can capture sufficient information to later query the constructed database and classify the data.

An important part of the classification process is to read thousands of diverse file types and to classify them as well as can be done. Some data is anticipated to be under classified and may require human review. By isolating the files into their best approximations, the human involvement is greatly reduced.

For example, a user may wish to find out how many files are in the index with coordinates in The North American Datum of 1927, Louisiana South Projection with X and Y units defined as feet. Phrase and/or keyword matching may be invoked to ascertain how many files match and what grade to assign the matches. A grade is a measure of confidence a match is responsive to the search.

Figure 17:
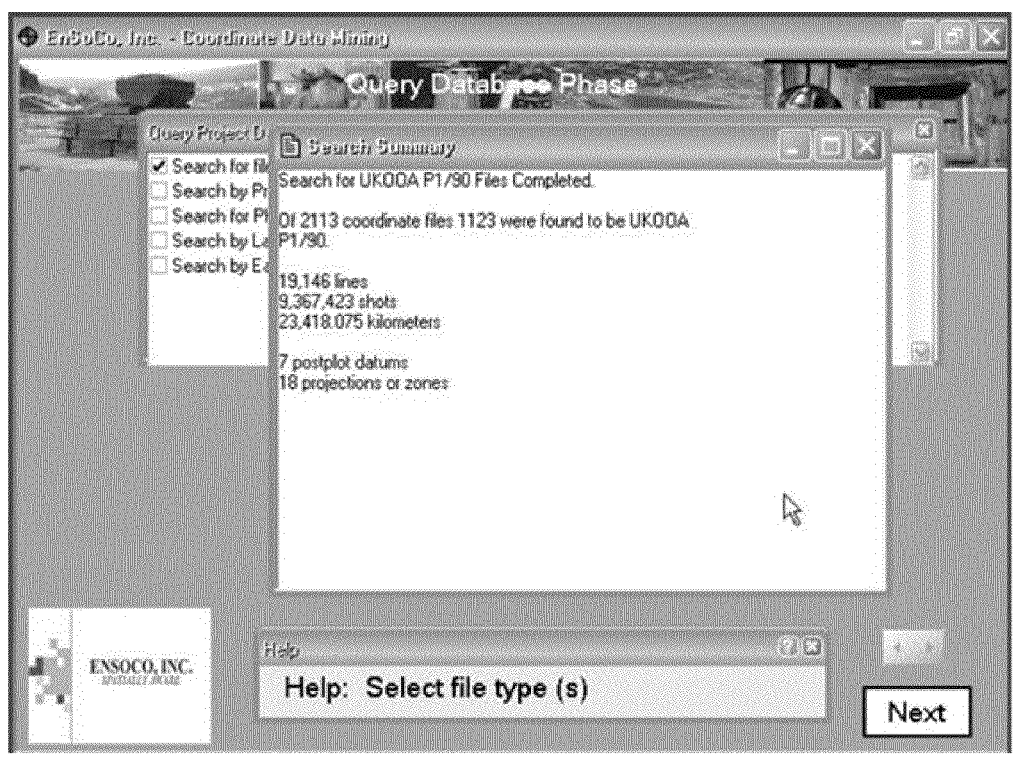
FIG. 17 shows the results of a search by file type(s)
Figure 18:
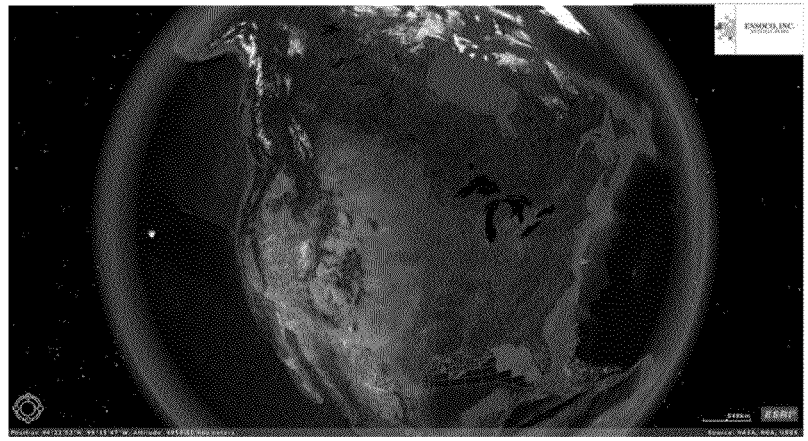
FIGS. 18-20 show geodetically classified data published to an industry based mapping application.
Figure 19:
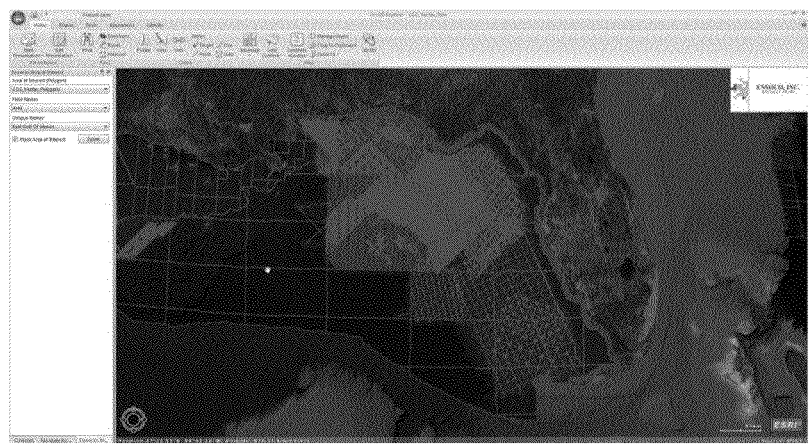
Figure 20:
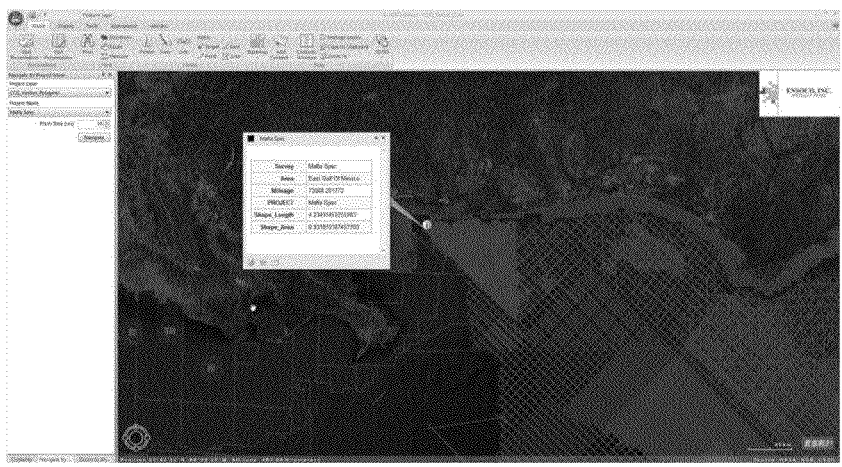

Another example may be a query of the index to determine how many files are in an industry positional format such as UKOOA P1/90 format or SPS format. FIG. 17 shows an example of the results of this type of search. In response to the query, the user may be provided with a list of subsets of the selected sources which share common values of keywords. The user may also be provided with statistics of each subset. The user may focus on one or more of the subsets to focus subsequent analysis and results. Data from the selected subsets may be displayed in a form such as a map with content in various details. FIGS. 18-20 show classified data published to an industry based mapping application; which allows the user to quickly evaluate location, content and compare to other mapping culture.

A third example may be to query the index for all files with a text string similar to "Jasper Texas". An example of this query is shown in FIG. 16.

Following the query performed in step 1102, step 1104 generates lists and reports with information regarding the number, types, names etc. of source files that contain matches to the query. Additionally depending on the type of query performed in step 1102, step 1106 copies the source files that match the query into separate folders under the Project Directory to facilitate input to other software applications for mapping, visualization and other geophysical and non-geophysical uses. The construction of the data mining database and the results of the specific queries can organize the data in a manner that makes the conversion of the temporary source files for input to other software applications faster and more efficient. The possible INPUT formats may include most of the standards listed as possible sources as well as the Extensible Markup Language (XML)[2] or geological markup language (GML)[3] formats. Other areas made more efficient for the user is the detection of duplicate data files and records (a common problem in the Oil and Gas industry that leads to misrepresentation of company assets) and transforming the geodetic parameters of subsets of the data in order to produce outputs that have a consistent coordinate system.

[2] The Extensible Markup Language is described at http://www.w3.org/XML/.
[3] GML formats are described at http://www.openspatial.org/standards/gml.

Referring to FIG. 12, depicted is a process 1200 for determining the format of the data records contained in the source files. This process is also referred to as Scan 1. An example of the application of this process is provided below in Appendix C.

Figures 21, 22:
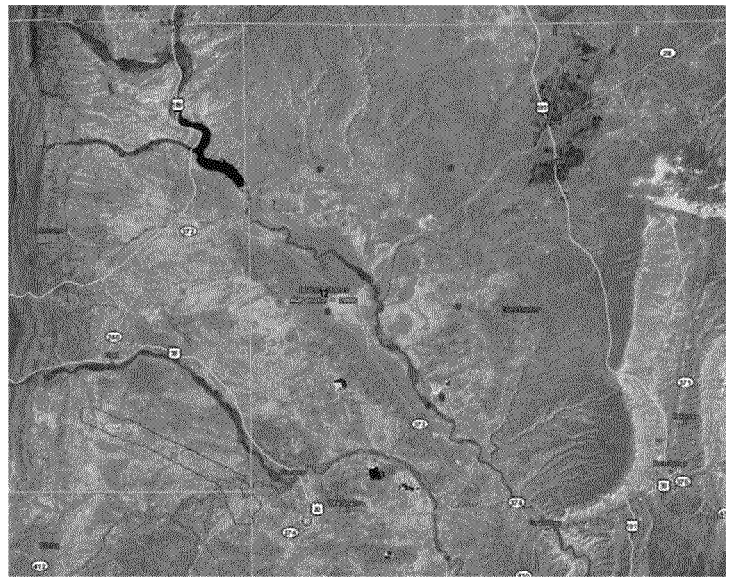
FIGS. 21-22 show an example of a 3D survey boundary file as a mapping image and as a data file.

A pattern of fields which appears frequently may be considered a data record. This is because data records generally occur more frequently in files than header records, except for very small files such as 3D survey boundary files where a few discrete points might be sufficient to describe a large amount of spatial data. FIGS. 21 and 22 show an example of this case, in map view with the corresponding file contents.

Figure 23:
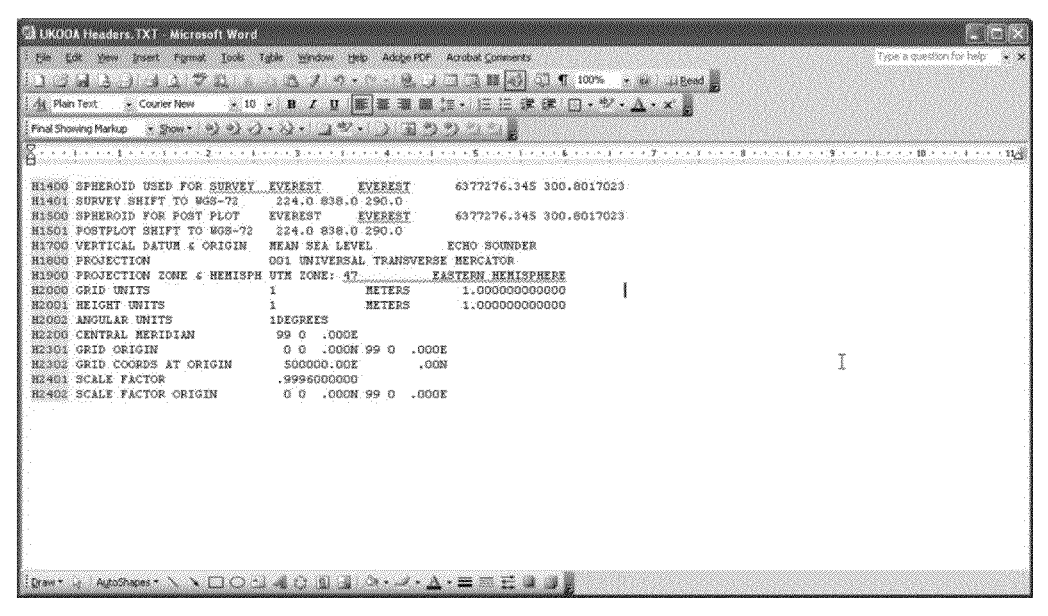

The first records in the file may typically be considered header records. Records explicitly marked with certain predefined characters in the first column may be considered header records. FIG. 23 shows an example of explicitly marked header records.

Process 1200 begins with step 1202. Step 1202 loads a number of input records and parses the record into 'm' character strings (fields), each separated by one or more blanks or a separator. Each string is assigned a type based on the contents.

Available Field types are:

| | |
|---|---|
| Integer | A field that contains only digits, the plus sign ("+"), and the minus sign ("−"). |
| Real | A field which (1) is not in the integer category, (2) consists of only digits, the plus sign, the minus sign, a decimal point, an uppercase "E," and a lowercase "e" (exponential notations), and (3) has only one decimal point. |
| Long numeric | A field with contents that would be in the integer or real number categories but for it (1) being longer than nine characters and/or (2) having greater than one decimal points is initially categorized as a Long numeric. These are subsequently re-classified as one or more fields of type Integer or Real. |
| Pn | A field that contains only special predefined forms for latitude and longitude (as defined in appendix B). Most of these consist of Integer or Real plus the letters N, S, E, W. |
| Alphanumeric | Any field not belonging to one of the above categories. |

If the first field is found to contain only certain predefined alpha values, it is treated as a record type flag and is used to subset the data into multiple stanzas, one for each value of this flag after reading 'n' records, an m×n matrix is defined, each entry specifying the strings content. Each record is typed as free-form or unknown based on the dominant separator. (A typical separator may be a blank, a comma or a tab. The most common separator which is found will be called the "dominant separator").

Following step 1202, the process 1200 continues to step 1204. Unknown format types are further analyzed in groups to determine if they are fixed or free-form format. This determination is based on the dominant record type. A choice is made as to whether to treat stanza data as free-form or fixed.

Following step 1204, the process 1204 continues to step 1206. All records that are the type selected (free-form or fixed) are compared for content. The most frequent sequence of field types is determined and assigned as the initial layout. For free-form this determines which records are data and which are either header records or unclassified records Header records are analyzed during Scan 2 (FIG. 13). For fixed formats more analysis will be performed based on the position of the fields. This will allow for missing fields and for fields with no proper separator.

Following step 1206, the process 1200 continues to step 1208. Based on the sequence of field types from the selected type of data records, records that differ from the most frequent pattern are flagged as unclassified. This is done for both free-form and fixed formats. Free-form records need only be consistent in the sequence of the content of the fields. Columns do not need to be consistent from record to record.

Following step 1208, the process 1200 continues to step 1210. For the files that have been determined to be in fixed format a template is formed by combining the field limits from all the selected data records in a manner that forms a fixed format for each field that includes all fields that overlap.

Following step 1210, the process 1200 continues to step 1212. Continuing with only the fixed format files the template is then used to check all records flagged as unclassified to see if they represent a superset of the fields represented by the template. Records that fit the template are selected and the additional fields are inserted into the template. This represents a case where most of the records have a field left blank and records in the superset define that field. The updated template is checked again against all remaining unclassified records to detect cases where two or more contiguous fields in the unclassified record are contained in the same space as one field in the template and all other fields are consistent. This causes the one field in the template to be split appropriately forming new fields consistent with the overlapping fields.

Following step 1212, the process 1200 continues to step 1214. Fixed format data records that contain long numeric type fields may be split into useable fields in one of two ways. The first approach is to split them based on the template formed from all data records selected that do not have long numeric strings. If this still leaves records with fields that contain long numerics, an attempt is made to split the long numeric by scanning all such records as a group looking for a pattern that indicates the start of a field internally. This is based on the nature of positional data sharing same or similar digits in the beginning positions from record to record for that same field. The search for such a break starts in the middle of a long numeric and accepts the first set of columns that qualifies. If either of the 2 resulting fields is still 9 digits or longer, another search is started at the middle of the new long numeric and another split may occur if a qualified column is found. A column n qualifies if most of the consecutive digits in it are only different by an amount ranging from −1 to +1 from the same column in a preceding record.

If the long numeric cannot be split using either of the above techniques, the long numeric may be classified as a normal integer.

Following step 1214, the process 1200 continues to step 1216. The layout/templates for all of the fixed format data records are compared to a database of templates associated with standard known formats. The known formats may be stored in a database similar to the database in Appendix B. The known formats may include the formats described and maintained by the survey and positioning committee of the Oil and Gas Producers Association[4] and the Society of Exploration Geophysicists[5]. Other legacy formats may be used for the recording and exchange of positional information, such as SEGY, SEGD, SEG P1, SPS, UKOOA p1, P6, P7, and earlier versions P1/76 and P1/78, Witsml[6], and other undocumented and documented textual formats. The formats may include text files in ASCII or EBCDIC format (while special purpose readers handle some known BINARY formats) any or all of which may be contained within various compression or archival formats. If a match is found the file is classified accordingly in the data mining database and an associated reader will be employed to extract the appropriate information from it based on a user query, or when a file is to be used in other mapping, visualization, geophysical etc. software applications. Otherwise the file is classified as generic and a general purpose reader is used to access both the header and data records. Examples of the database entries defining some possible fixed formats are contained in Appendix D.

[4] These formats include the P1/90, P2/94, P5/94, P6/98, P7/2000, and P-EPSG formats available at http://www.epsg.org/p-formats.html.
[5] These formats include the digital recorders, marine energy sources, marine streamers, SEG ADS, SEG ADS reading sample, SEG ADS Trace Attribute, SEG ADS Trace Edit, SEG Polarity 1975, SEG Polarity 1993, SEG Rode, SEG Rode 1996, SEG Rode 1997, SEG SPS, SEG SPS rev 2.1, SEG-2, SEG-A, SEG-B, SEG-EX, SEG-C, SEG-D, SEG-D rev 1, SEG-D rev 2, SEG-D rev 2.1, SEG-D rev 300, SEG-P1, SEG-P2, SEG-P3, SEG-Y, SEG-Y rev 1, MT/EMAP, UKOOA P1/90, UKOOA P2/91, UKOOA P2/94, UKOOA P5/94, and SEG SI Metric formats available at http://www.seg.org/SEGportalWEBproject/portals/SEG_Online portal;jsessionid=1dT2J95f17JxJJFytYpYrV2 mwjzrtgRv LCT58B8wmnhr1vCfHZk2!503362133?_nfpb=true&pageLabel=pg_gen_ content&Doc_Url=prod/SEG-Publications/Pub-Technical-Standards/technicalstandards.htm.
[6] The standard for the WITSML format is available at http://www.witsml.org/witsml/Default.asp.

Following step 1216, the process 1200 continues to step 1218. For all free-form and any fixed format files that cannot be classified as a standard format, the file is classified as a generic file in the data mining database and a generic file descriptor is generated that provides access to the file via a corresponding generic reader that is provided as part of this application. The required information is recorded in a descriptor file that is name-associated with the original source file.

Following step 1218, the process 1200 continues to step 1220. All stanzas that have not had their format resolved are copied into a special folder for the user to either determine the format manually or reject the file from being considered in the Project. The user will create a generic file descriptor that is name-associated with the original source file and the file will be classified as a generic format in the data mining database.

Referring to FIG. 13, depicted is a process 1300 for determining the format of the header records contained in the source files. This process is also referred to as Scan 2. The process 1300 may attempt to match the contents of fields with an extensive list of keywords and permissible values for these keywords. The process 1300 also extracts information and values from header records that are in a known format.

Process 1300 begins at step 1302. Step 1302 parses the header records into fields. All records from Scan 1 (process 1200) that were not determined to be data records are considered to be header records for purposes of Scan 2. Header records will be parsed into fields. A field is a text string separated by a blank, comma, colon or tab. The choice of the dominant separator character will be done after scanning each header and determining which separator is more commonly used than the others. This may be done for all headers or selected for each header. A field may therefore contain one or more words separated by blanks If more than two words are in the target value, the matching process allows one word to be missing.

Following step 1302, the process 1300 continues to step 1304. Step 1304 matches the fields that were determined by step 1302 and matches the contents to the keywords and values from the Keyword database. Step 1304 mainly targets files with an unknown format and known formats that contain free-form header records. However, headers from known formats that contain fixed form header records are also scanned for keyword matches in step 1304. An example of a possible Keyword list is found in Appendix E. The list of possible keyword matches is sorted by length. This allows for a stop when a perfect match is found and assurance of the best match. Based on the length of text to be found and matched, a maximum number of errors may be allowed in a keyword match. This might need to be pre-assigned for each keyword and value based on the alternate values and how similar they are. Short words and numeric fields may not be matched exactly. An industry standard method is employed to match two strings with "n" errors. An error is counted when it is necessary to add, delete or replace a character in the input text in order to continue to match the target string (keyword). For example, alpha compared to alpa, alxpha and xalpha would all have 1 error.

Each keyword match within a file must be recorded along with the number of errors. If there are any duplicates the match with the fewest errors is chosen. The user may choose to see all of them, and then eliminate one or more choices in order to force the selection of another. Step 1304 may make the following assignments.

1. All or part of a field matches a defined value for any keyword. Matches need not be exact for longer values. The user might use a flag in the keyword definition list to note "exact needed".

2. Part of a field (start or end) is a keyword is a keyword. In this case the other portion of the field is treated as the value of the field. The characters "=","/","("'and')" are ignored.
3. A field that consists of two parts separated by "=","/"," ("or")" will be presented as a possible assignment even if there are no matches.
4. If all of a field matches a known keyword all other fields are scanned for a possible value. In case of multiple matches, the closest field is chosen.

Examples of header records containing the 4 possible assignments can be found in Appendix A.

After scanning the header records for all the source files for keyword/value matches, a number of exceptions can occur. These may fall into several categories. The worst case is generated with form 3 above; the keyword is not a known match. Others will be generated by form 2 when an unknown value is assigned to a list type keyword or an alpha value is assigned to a numeric type keyword.

The keywords will be defined as both full words like "North American Datum 1927" and as abbreviations like "NAD-27" in the software. A match for words like East, North, Datum, Spheroid, feet etc. will also be defined. The user may add keywords such as "Walker County", "Bighorn" etc. based on the specific project.

If all of a field matches a known keyword, all other fields are scanned for a possible value. In case of multiple matches the closest field to the keyword is chosen.

Detailed specifications of the Matching Algorithm can be found in Appendix F.

Following step 1304, the process 1300 continues to step 1306. Step 1306 targets the header records that are in a known format that defines header records in a fixed field format. Step 1306 uses readers designed for each known format to extract all geodetic and other relevant information from the header records. Examples of other relevant information could include (but not be limited to) such items as type of data records contained in the file (source, receiver, vessel, bathymetric etc.), parameters used in deriving the geodetic and other values contained in the data records, specific information regarding the collection of the data used to derive the values in the data records, etc. Step 1306 along with step 1304 will ensure that the maximum amount of information is extracted from fixed form headers records.

Following step 1306, the process 1300 continues to step 1308. Step 1308 updates the data mining database with all information collected during process 1300.

Having thus described the present invention in various embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments.

Appendix A—Example Header Records

Underlined and superscripted characters strings in the headers below are examples of different keyword matches. The superscript numbers which are not part of the record structure refer to the types of keyword matching which are detailed following the headers.

---

Seismic Survey Location Data in <u>SEGP1</u>[1] format (see Geophysics, <u>vo148/no4</u>[3], 1983).
Generated on 07-Oct-2002 08:45:53 using Intrex DataPipe Export Routine........

Coordinates Transformed Using USGS State Plane <u>Zone: 4203</u>[4]
For Further Information Contact: Shonda Mason 832-590-5245
HPEARL RIVER MOUTBASIN, SOUICHINA SEA
GROUP PARTICIPANTS
CONTRACTOR: OSI, NAV. CONTRACTOR: ONI, NAV. PROCESSOR: GSI
SURVEY DATES: SEPT. 1979 TO MARC1980
NAVIGATON SYSSYSTEMS: PRIMARY: ARGO, SECONDARY: MAXIRAN
POSITION MAPPED: AIRGUN, 56M OFFSET
<u>SPHEROID: WGS-72</u>[4]
<u>PROJECTION: LAMBERT</u>[4]
LAT. ORIGIN: 021000000N
LONG. ORIGIN: 114000000E
<u>UNITS: METERS</u>[4]
MACDUFF GAS FIELD NORTSEA BLOCK NS49
AMERICAN NATIONAL OIL CO., CONTRACTOR: 0SI, NAV. CONTRACTOR: GSI
NAV. PROCESSOR: GSI SURVEY DATES: JUNE-JULY 1978
NAV. PRIME: SYLEDIS, NAV. SECONDARY: SATELLITE, NAV. BACKUP: MINI-RANGER
USING PRIME ANTENNA-OFFSET TO SOURCE: 41.81, SOURCE TO
NEAR TRACE: 276, GROUP INTERVAL: 50, SOURCE DEPTH: 6.5, SIMRAD FATH. MODEL
EA, VEL. CONVERSION 1500 M/SEC. FATH. DEPTBELOW WATER LINE: 10 FEET
<u>SPHEROID: INTERNATIONAL</u>[4], <u>DATUM=ED-50</u>[2] (X=+84, Y=+103, Z=+127) DMA
<u>PROJECTION: TIME, ZONE 31</u>[4]
SYLEDIS: OP. FREQUENCY 440 MHZ LANE WIDT1 METRE
BASE1 60512460N001280964E Y= 6747971 X= 416842CC 9-16
BASE2 61032067N001424614E Y= 6769840 X= 430503CC 17-24
BASE3 61214834N001344770E Y= 6804257 X= 424064CC 25-32
MINIRANGER: CC 1-8 NOT FULLY OPERATIONAL
BASE STATION CONTRACTOR: GSI, SATELLITE SURVEY REFERENCE PARAMETER 1 = SPNUMBER, REFERENCE PARAMETER 2 = SEISMIC REC.[3]
NUMBER STREAMER: 16 DIGICOURSE COMPASSES, OFFSET FROM SOURCE TO 1ST CMP: 324,
16 DEPTH SENSORS, OFFSET FROM SOURCE TO 1ST DEPTH TRANSDUCER: 270,

---

[1] All or part of a field matches a defined value for any keyword. Matches need not be exact for longer values. The user might use a flag in the keyword definition list to note "exact needed".
[2] Part of a field (start or end) is a keyword is a keyword. In this case the other portion of the field is treated as the value of the field. The characters "=", "/", "(", and ')' are ignored.
[3] A field that consists of two parts separated by "=", "/", "(" or ")" will be presented as a possible assignment even if there are no matches.
[4] If all of a field matches a known keyword all other fields are scanned for a possible value. In case of multiple matches, the matching field which is physically located closest to the field matching the known keyword is chosen.

Appendix B—Data Mining Database

Data Mining Database
Tables:

| Machines | |
|---|---|
| Machine ID Number | INTEGER NOT NULL, |
| IP Address | VARCHAR(20), |
| Original Machine Name | INTEGER, |
| Connect Type | VARCHAR(10), |
| Display Name | VARCHAR(30), |
| Connect Name | VARCHAR(30), |
| File System Type | VARCHAR(10), |
| CONSTRAINT pk_machines PRIMARY KEY (Machine ID Number)) | |

| Original File | |
|---|---|
| File ID Number | INTEGER NOT NULL, |
| Local File Name | VARCHAR(20), |
| Original Machine Name | VARCHAR(20), |
| Original File Path | VARCHAR(254), |
| Original File Name | VARCHAR(127), |
| File Size in Bytes | INTEGER, |
| File Check Sum Value | VARCHAR(12), |
| Number of Record in File | INTEGER, |
| File Type | VARCHAR(20) |
| CONSTRAINT pk_orig_files PRIMARY KEY (File ID Number)) | |

| Stanzas Table | |
|---|---|
| Stanza ID Number | INTEGER NOT NULL, |
| File ID Number | INTEGER NOT NULL, |
| Stanza Start Byte | INTEGER, |
| Stanza End Byte | INTEGER, |
| Number of Headers | INTEGER, |
| Valid Headers | VARCHAR(5), |
| Latitude/Longitude Measurement Unit | VARCHAR(10), |
| X and Y unit Measurement Unit | VARCHAR(10), |
| Depth/Elevation Measurement Unit | VARCHAR(10), |
| Latitude/Longitude Format Code | VARCHAR(10), |
| Latitude/Longitude Format | VARCHAR(50), |
| X and Y Format | VARCHAR(50), |
| Depth/Elevation Format | VARCHAR(20), |
| File Type | VARCHAR(20), |
| Area | VARCHAR(50), |
| Area - Country | VARCHAR(50), |
| Area - State | VARCHAR(50), |
| Area - API | VARCHAR(50) |
| CONSTRAINT pk_stanzas PRIMARY KEY (Stanza ID Number) | |
| CONSTRAINT fk_file_number FOREIGN KEY (File ID Number) | |
| REFERENCES Original File (File ID Number)) | |

| Attributes Table | |
|---|---|
| Attribute ID number | INTEGER NOT NULL, |
| Stanza ID Number | INTEGER NOT NULL, |
| EPSG Ellipsoid Code | INTEGER, |
| EPSG Datum Code | INTEGER, |
| EPSG Projection Type Code | INTEGER, |
| EPSG Projection Zone Code | INTEGER, |
| Ellipsoid Name | VARCHAR(20), |
| Datum Name | VARCHAR(20), |
| Projection Name | VARCHAR(20), |
| Projection Zone Name | VARCHAR(20), |
| CONSTRAINT pk_attributes PRIMARY KEY (Attribute ID Number), | |
| CONSTRAINT fk_stanza_number FOREIGN KEY | |
| (Stanza ID Number) REFERENCES stanzas (Stanza ID Number)) | |

Keywords Table

| Keyword ID Number | INTEGER NOT NULL |
|---|---|
| Attribute ID number | INTEGER NOT NULL, |
| Keyword Value | VARCHAR(30) |
| CONSTRAINT pk_keywords PRIMARY KEY (Keyword ID Number), | |
| CONSTRAINT fk_attributes FOREIGN KEY (Attribute ID Number) | |
| REFERENCES stanzas (Attribute ID Number)) | |

| Latitude/Longitude Format Types Table | |
|---|---|
| LL Format Type ID | INTEGER NOT NULL, |
| Stanza ID Number | INTEGER NOT NULL, |
| LL Format Type Description Mask | |
| Number of Places After the Decimal Point (if applicable) | |
| CONSTRAINT pk_latlon_format_type PRIMARY KEY | |
| (LL Format Type ID), | |
| CONSTRAINT fk_stanza_number FOREIGN KEY (Stanza ID Number) | |
| REFERENCES stanzas (Stanza ID Number)) | |

Possible Types and Description Masks are:

| LL Format Type ID | LL Format Description Mask | # of Places After the Decimal |
|---|---|---|
| 1 | DDD MM SS.SSSS H | 0 |
| 2 | DDDMMSSSSH | 0 |
| 3 | DDDMMSS.SSH | 0 |
| 4 | DDDMMSSSH | 0 |
| 5 | DDDMMSS.SH | 0 |
| 6 | DDD.DDDDDDH | 0 |
| 7 | DDDDDDDDDH (Implied Decimal) | 8 |
| 8 | +/− DDD MM.MM | 0 |
| 9 | +/− DDD.DDDDDD | 6 |
| 10 | +/− DDD MM SS.SSSS | 0 |
| 11 | +/− DDDMMSSSS | 0 |
| 12 | +/− DDDMMSS.SS | 0 |
| 13 | +/− DDDMMSSS | 0 |
| 14 | +/− DDDMMSS.S | 0 |
| 15 | +/− DDDMMSS.SSS | 0 |

X/Y Format Types Table

| | |
|---|---|
| X/Y Handling Code | INTEGER NOT NULL, |
| Stanza ID Number | INTEGER NOT NULL, |
| X/Y Field Width (# Digits) | |
| X/Y # places after the decimal point | |
| Number of Places After the Decimal Point (if applicable) | |
| CONSTRAINT pk_xy_format PRIMARY KEY (XY Handling Code) | |
| CONSTRAINT fk_stanza_number FOREIGN KEY (Stanza ID Number) | |
| REFERENCES stanzas (Stanza ID Number)) | |

For Example:

| X/Y Handling Code | Field Width | #Places after Decimal Point |
|---|---|---|
| 1 - Double Precision Real | 9 | 1 |
| 2 - Integer - Implied Decimal Point | 9 | 1 |
| 3 - Integer - Rounded to Nearest Whole Integer | 9 | 0 |

Lines Table

| | |
|---|---|
| Line ID Number | INTEGER NOT NULL, |
| Line Name | VARCHAR(50), |

Lines Table (continued)

| | |
|---|---|
| Stanza ID Number | INTEGER NOT NULL, |
| Dates Included | INTEGER, |
| Times Included | INTEGER, |
| Year Shot | INTEGER, |
| Shot Distance | FLOAT, |
| Mileage | FLOAT, |
| Minimum X Value | DOUBLE PRECISION, |
| Minimum Y Value | DOUBLE PRECISION, |
| Minimum Latitude Value | DOUBLE PRECISION, |
| Minimum Longitude Value | DOUBLE PRECISION, |
| Minimum Shot Point | INTEGER, |
| Maximum Shot Point | INTEGER, |
| Minimum Depth/Elevation | FLOAT, |
| Maximum Depth/Elevation | FLOAT |
| CONSTRAINT pk_line_id PRIMARY KEY (Line ID Number), | |
| CONSTRAINT fk_stanza_number FOREIGN KEY (Stanza ID Number) | |
| REFERENCES stanzas (Stanza ID Number)) | |

Appendix C—Example of Process 1200

The following is an example of a SCAN 1 process 1200 performed on a set of data records of unknown format.

Initial Data Records Example

```
CLT4960  14231423  12340B17543354N110445881E  155590  161670  857917065028
CLT4960  14231423  12350B17544044N110445458E  155470  161885  863919065151
CLT4960  14231423  12360B17544727N110445012E  155343  162097  916917065316
CLT4960  14231423  12370B17545421N110444563E  155215  162313  987917065440
CLT4960  14231423  12380B17550118N110444121E  155090  162530  1012917065605
CLT4960  14231423  12390B17550814N110443685E  154966  162747  1117919065729   465
CLT4960  1423 546  12400B17551513N110443252E  154843  162964  1006919065853
CLT4960  1423 546  12410 17552219N110442824E  154721  163184  1004917070015
CLT4960  1423 546  12420 17552930N110442412E  154604  163405  983917070136
CLT4960  1423 546  12490a17561750N110435272E  153711  164905  1247917071113
CLT4960  1423 546  12500a17562454N110434840E  153588  165124  1310917071238
CLT4960  1423 546  12510a17563157N110434409E  153465  165343  1307917071402
CLT4960  1423 546  12520a17563853N110433972E  153341  165560  1196917071530
CLT4960  1423 546  12530a17564548N110433538E  153218  165776  994917071754
CLT4960  1423 546  12420a17552930N110442412E  154604  163405  983917070136
CLT4960  1423 546  12430a17553633N110441988E  154484  163624  997917070258
CLT4960  14231423  12440a17554332N110441557E  154361  163841  1014919090420
CLT4960  14231423  12450a17555022N110441109E  154234  164056  1102919090540
CLT4960  14231423  12460a17555706N110440652E  154104  164269  1098917070701
CLT4960  14231423  12470a17560386N110440186E  153971  164481  1070927090824
CLT4960  14231423  12480a17561064N110435719E  153838  164692  1111927090948
CLT4960  14231423  12490a17561750N110435272E  153711  164905  1247927071113
CLT4960  14231423  12500a17562454N110434840E  153588  165124  1310927071238
CLT4960  14231423  12510a17563157N110434409E  153465  165343  1307927071402
CLT4960  14231423  12520a17563853N110433972E  153341  165560  1196927071530
CLT4960  14231423  12530a17564548N110433538E  153218  165776  994927071754
```

Mark Inconsistent Records Step 1208

Based on the sequence of field types from the selected type of data records, records that differ from the most frequent pattern are flagged as unclassified (in bold). This is done for both free form and fixed formats.

```
CLT4960    14231423   12340B17543354N110445881E   155590   161670   857917065028
CLT4960    14231423   12350B17544044N110445458E   155470   161885   863919065151
CLT4960    14231423   12360B17544727N110445012E   155343   162097   916917065316
CLT4960    14231423   12370B17545421N110444563E   155215   162313   987917065440
CLT4960    14231423   12380B17550118N110444121E   155090   162530   1012917065605
CLT4960    14231423   12390B17550814N110443685E   154966   162747   1117919065729   465
CLT4960    1423 546   12400B17551513N110443252E   154843   162964   1006919065853
CLT4960    1423 546   12410 17552219N110442824E   154721   163184   1004917070015
CLT4960    1423 546   12420 17552930N110442412E   154604   163405   983917070136
CLT4960    1423 546   12490a17561750N110435272E   153711   164905   1247917071113
```

-continued

| | | | | | | |
|---|---|---|---|---|---|---|
| CLT4960 | 1423 546 | 12500a17562454N110434840E | 153588 | 165124 | 1310917071238 | |
| CLT4960 | 1423 546 | 12510a17563157N110434409E | 153465 | 165343 | 1307917071402 | |
| CLT4960 | 1423 546 | 12520a17563853N110433972E | 153341 | 165560 | 1196917071530 | |
| CLT4960 | 1423 546 | 12530a17564548N110433538E | 153218 | 165776 | 994917071754 | |
| CLT4960 | 1423 546 | 12420a17552930N110442412E | 154604 | 163405 | 983917070136 | |
| CLT4960 | 1423 546 | 12430a17553633N110441988E | 154484 | 163624 | 997917070258 | |
| CLT4960 | 14231423 | 12440a17554332N110441557E | 154361 | 163841 | 1014919090420 | |
| CLT4960 | 14231423 | 12450a17555022N110441109E | 154234 | 164056 | 1102919090540 | |
| CLT4960 | 14231423 | 12460a17555706N110440652E | 154104 | 164269 | 1098917070701 | |
| CLT4960 | 14231423 | 12470a17560386N110440186E | 153971 | 164481 | 1070927090824 | |
| CLT4960 | 14231423 | 12480a17561064N110435719E | 153838 | 164692 | 1111927090948 | |
| CLT4960 | 14231423 | 12490a17561750N110435272E | 153711 | 164905 | 1247927071113 | |
| CLT4960 | 14231423 | 12500a17562454N110434840E | 153588 | 165124 | 1310927071238 | |
| CLT4960 | 14231423 | 12510a17563157N110434409E | 153465 | 165343 | 1307927071402 | |
| CLT4960 | 14231423 | 12520a17563853N110433972E | 153341 | 165560 | 1196927071530 | |
| CLT4960 | 14231423 | 12530a17564548N110433538E | 153218 | 165776 | 994927071754 | |

Free formatted records need only be consistent in the sequence of the content of the fields. Columns do not need to be consistent from record to record.

Fixed Formats Only

Form Initial Template Step 1210

A template is formed by combining the field limits from the data records with the most frequent pattern (in bold) in a manner that forms a fixed format for each field that includes all fields that overlap. Templates are shown italicized below.

| | | | | | | |
|---|---|---|---|---|---|---|
| CLT4960 | 14231423 | 12340B17543354N110445881E | 155590 | 161670 | 857917065028 | |
| CLT4960 | 14231423 | 12350B17544044N110445458E | 155470 | 161885 | 863919065151 | |
| CLT4960 | 14231423 | 12360B17544727N110445012E | 155343 | 162097 | 916917065316 | |
| CLT4960 | 14231423 | 12370B17545421N110444563E | 155215 | 162313 | 987917065440 | |
| CLT4960 | 14231423 | 12380B17550118N110444121E | 155090 | 162530 | 1012917065605 | |
| CLT4960 | 14231423 | 12390B17550814N110443685E | 154966 | 162747 | 1117919065729 | 465 |
| CLT4960 | 1423 546 | 12400B17551513N110443252E | 154843 | 162964 | 1006919065853 | |
| CLT4960 | 1423 546 | 12410 17552219N110442824E | 154721 | 163184 | 1004917070015 | |
| CLT4960 | 1423 546 | 12420 17552930N110442412E | 154604 | 163405 | 983917070136 | |
| CLT4960 | 1423 546 | 12490a17561750N110435272E | 153711 | 164905 | 1247917071113 | |
| CLT4960 | 1423 546 | 12500a17562454N110434840E | 153588 | 165124 | 1310917071238 | |
| CLT4960 | 1423 546 | 12510a17563157N110434409E | 153465 | 165343 | 1307917071402 | |
| CLT4960 | 1423 546 | 12520a17563853N110433972E | 153341 | 165560 | 1196917071530 | |
| CLT4960 | 1423 546 | 12530a17564548N110433538E | 153218 | 165776 | 994917071754 | |
| CLT4960 | 1423 546 | 12420a17552930N110442412E | 154604 | 163405 | 983917070136 | |
| CLT4960 | 1423 546 | 12430a17553633N110441988E | 154484 | 163624 | 997917070258 | |
| CLT4960 | 14231423 | 12440a17554332N110441557E | 154361 | 163841 | 1014919090420 | |
| CLT4960 | 14231423 | 12450a17555022N110441109E | 154234 | 164056 | 1102919090540 | |
| CLT4960 | 14231423 | 12460a17555706N110440652E | 154104 | 164269 | 1098917070701 | |
| CLT4960 | 14231423 | 12470a17560386N110440186E | 153971 | 164481 | 1070927090824 | |
| CLT4960 | 14231423 | 12480a17561064N110435719E | 153838 | 164692 | 1111927090948 | |
| CLT4960 | 14231423 | 12490a17561750N110435272E | 153711 | 164905 | 1247927071113 | |
| CLT4960 | 14231423 | 12500a17562454N110434840E | 153588 | 165124 | 1310927071238 | |
| CLT4960 | 14231423 | 12510a17563157N110434409E | 153465 | 165343 | 1307927071402 | |
| CLT4960 | 14231423 | 12520a17563853N110433972E | 153341 | 165560 | 1196927071530 | |
| CLT4960 | 14231423 | 12530a17564548N110433538E | 153218 | 165776 | 994927071754 | |
| *11111111* | *22222222* | *33333333333333333333333* | *444444* | *555555* | *66666666666666* | |
| *A* | *I* | *A* | *I* | *I* | *L* | |

Assemble Similar Records—Step 1212 Part 1

This template is then used to check all records flagged as unclassified to see if they represent a superset of the fields represented by the template. Records that fit are selected and the additional fields inserted into the template (for example, the new 7$^{th}$ field "465" found on record 6 below in bold). This represents a case where most of the records have a field left blank and the exceptional records define that field.

| | | | | | |
|---|---|---|---|---|---|
| CLT4960 | 14231423 | 12340B17543354N110445881E | 155590 | 161670 | 857917065028 |
| CLT4960 | 14231423 | 12350B17544044N110445458E | 155470 | 161885 | 863919065151 |
| CLT4960 | 14231423 | 12360B17544727N110445012E | 155343 | 162097 | 916917065316 |
| CLT4960 | 14231423 | 12370B17545421N110444563E | 155215 | 162313 | 987917065440 |

| | | | | | | |
|---|---|---|---|---|---|---|
| CLT4960 | 14231423 | 12380B17550118N110444121E | 155090 | 162530 | 1012917065605 | |
| CLT4960 | 14231423 | 12390B17550814N110443685E | 154966 | 162747 | 1117919065729 | 465 |
| CLT4960 | 1423 546 | 12400B17551513N110443252E | 154843 | 162964 | 1006919065853 | |
| CLT4960 | 1423 546 | 12410 17552219N110442824E | 154721 | 163184 | 1004917070015 | |
| CLT4960 | 1423 546 | 12420 17552930N110442412E | 154604 | 163405 | 983917070136 | |
| CLT4960 | 1423 546 | 12490a17561750N110435272E | 153711 | 164905 | 1247917071113 | |
| CLT4960 | 1423 546 | 12500a17562454N110434840E | 153588 | 165124 | 1310917071238 | |
| CLT4960 | 1423 546 | 12510a17563157N110434409E | 153465 | 165343 | 1307917071402 | |
| CLT4960 | 1423 546 | 12520a17563853N110433972E | 153341 | 165560 | 1196917071530 | |
| CLT4960 | 1423 546 | 12530a17564548N110433538E | 153218 | 165776 | 994917071754 | |
| CLT4960 | 1423 546 | 12420a17552930N110442412E | 154604 | 163405 | 983917070136 | |
| CLT4960 | 1423 546 | 12430a17553633N110441988E | 154484 | 163624 | 997917070258 | |
| CLT4960 | 14231423 | 12440a17554332N110441557E | 154361 | 163841 | 1014919090420 | |
| CLT4960 | 14231423 | 12450a17555022N110441109E | 154234 | 164056 | 1102919090540 | |
| CLT4960 | 14231423 | 12460a17555706N110440652E | 154104 | 164269 | 1098917070701 | |
| CLT4960 | 14231423 | 12470a17560386N110440186E | 153971 | 164481 | 1070927090824 | |
| CLT4960 | 14231423 | 12480a17561064N110435719E | 153838 | 164692 | 1111927090948 | |
| CLT4960 | 14231423 | 12490a17561750N110435272E | 153711 | 164905 | 1247927071113 | |
| CLT4960 | 14231423 | 12500a17562454N110434840E | 153588 | 165124 | 1310927071238 | |
| CLT4960 | 14231423 | 12510a17563157N110434409E | 153465 | 165343 | 1307927071402 | |
| CLT4960 | 14231423 | 12520a17563853N110433972E | 153341 | 165560 | 1196927071530 | |
| CLT4960 | 14231423 | 12530a17564548N110433538E | 153218 | 165776 | 994927071754 | |
| *11111111* | *22222222* | *33333333333333333333333* | *444444* | *555555* | *666666666666666* | *777* |
| *A* | *I* | *A* | *I* | *I* | *L* | *I* |

Assemble Similar Records—Step 1212 Part 2

The updated template is checked again against all remaining unclassified records to detect cases where two or more contiguous fields in the unclassified record are contained in the same space as one field in the template and all other fields are consistent. This causes the one field in the template to be split appropriately forming new fields consistent with the overlapping fields. In the examples below (in bold), field 2 is split into 2 and field 3 is split into 3 separate fields.

| | | | | | | |
|---|---|---|---|---|---|---|
| CLT4960 | 14231423 | 12340B17543354N110445881E | 155590 | 161670 | 857917065028 | |
| CLT4960 | 14231423 | 12350B17544044N110445458E | 155470 | 161885 | 863919065151 | |
| CLT4960 | 14231423 | 12360B17544727N110445012E | 155343 | 162097 | 916917065316 | |
| CLT4960 | 14231423 | 12370B17545421N110444563E | 155215 | 162313 | 987917065440 | |
| CLT4960 | 14231423 | 12380B17550118N110444121E | 155090 | 162530 | 1012917065605 | |
| CLT4960 | 14231423 | 12390B17550814N110443685E | 154966 | 162747 | 1117919065729 | 465 |
| CLT4960 | 1423 546 | 12400B17551513N110443252E | 154843 | 162964 | 1006919065853 | |
| CLT4960 | 1423 546 | 12410 17552219N110442824E | 154721 | 163184 | 1004917070015 | |
| CLT4960 | 1423 546 | 12420 17552930N110442412E | 154604 | 163405 | 983917070136 | |
| CLT4960 | 1423 546 | 12490a17561750N110435272E | 153711 | 164905 | 1247917071113 | |
| CLT4960 | 1423 546 | 12500a17562454N110434840E | 153588 | 165124 | 1310917071238 | |
| CLT4960 | 1423 546 | 12510a17563157N110434409E | 153465 | 165343 | 1307917071402 | |
| CLT4960 | 1423 546 | 12520a17563853N110433972E | 153341 | 165560 | 1196917071530 | |
| CLT4960 | 1423 546 | 12530a17564548N110433538E | 153218 | 165776 | 994917071754 | |
| CLT4960 | 1423 546 | 12420a17552930N110442412E | 154604 | 163405 | 983917070136 | |
| CLT4960 | 1423 546 | 12430a17553633N110441988E | 154484 | 163624 | 997917070258 | |
| CLT4960 | 14231423 | 12440a17554332N110441557E | 154361 | 163841 | 1014919090420 | |
| CLT4960 | 14231423 | 12450a17555022N110441109E | 154234 | 164056 | 1102919090540 | |
| CLT4960 | 14231423 | 12460a17555706N110440652E | 154104 | 164269 | 1098917070701 | |
| CLT4960 | 14231423 | 12470a17560386N110440186E | 153971 | 164481 | 1070927090824 | |
| CLT4960 | 14231423 | 12480a17561064N110435719E | 153838 | 164692 | 1111927090948 | |
| CLT4960 | 14231423 | 12490a17561750N110435272E | 153711 | 164905 | 1247927071113 | |
| CLT4960 | 14231423 | 12500a17562454N110434840E | 153588 | 165124 | 1310927071238 | |
| CLT4960 | 14231423 | 12510a17563157N110434409E | 153465 | 165343 | 1307927071402 | |
| CLT4960 | 14231423 | 12520a17563853N110433972E | 153341 | 165560 | 1196927071530 | |
| CLT4960 | 14231423 | 12530a17564548N110433538E | 153218 | 165776 | 994927071754 | |
| *11111111* | *22223333* | *4444456666666666666666* | *777777* | *888888* | *999999999999999* | *000* |
| *A* | *I I* | *I   AP1* | *I* | *I* | *L* | *I* |

Fixed Formats with Long Numerics Step 1214

If any of the data records contain long numerics, these need to be split into usable fields in one of 2 ways. The first approach is to split them based on the template formed from all data records selected that do not have long numerics. If this still leaves records with fields that contain long numerics, an attempt is made to split the long numeric by scanning all such records as a group looking for a pattern that indicates the start of a field internally. This is based on the nature of positional data sharing same or similar digits in the beginning positions from record to record for that same field. The 91s and 92s below (in bold) is the indicator of the start of a new field. The search for such a break starts in the middle of a long numeric and accepts first set of columns that qualifies. If either of the 2 resulting fields is still 9 digits or more long, another search is started at the middle of it and another split may occur if a qualified column is found. A column qualifies if most of the consecutive digits in it differ by a range of −1 to +1 from the same column in a preceding record.

Column 1 blank - field definitions, 1-M
    value 1 = start of field
    value 2 = ending column
    value 3 = format code of contents required
        =1    alpha
        kn    for real numbers - k is the number of digits in the field n is the number of places after the decimal point
        =3    integer numeric
        −n    minus sign and a number → special formats
            −5 latitude
            −6 longitude
            −7 latitude/longitude pair An example database defining a few fixed formats is shown below.

```
CLT4960   14231423   12340B17543354N110445881E   155590   161670    857917065028
CLT4960   14231423   12350B17544044N110445458E   155470   161885    863919065151
CLT4960   14231423   12360B17544727N110445012E   155343   162097    916917065316
CLT4960   14231423   12370B17545421N110444563E   155215   162313    987917065440
CLT4960   14231423   12380B17550118N110444121E   155090   162530   1012917065605
CLT4960   14231423   12390B17550814N110443685E   154966   162747   1117919065729   465
CLT4960   1423 546   12400B17551513N110443252E   154843   162964   1006919065853
CLT4960   1423 546   12410 17552219N110442824E   154721   163184   1004917070015
CLT4960   1423 546   12420 17552930N110442412E   154604   163405    983917070136
CLT4960   1423 546   12490a17561750N110435272E   153711   164905   1247917071113
CLT4960   1423 546   12500a17562454N110434840E   153588   165124   1310917071238
CLT4960   1423 546   12510a17563157N110434409E   153465   165343   1307917071402
CLT4960   1423 546   12520a17563853N110433972E   153341   165560   1196917071530
CLT4960   1423 546   12530a17564548N110433538E   153218   165776    994917071754
CLT4960   1423 546   12420a17552930N110442412E   154604   163405    983917070136
CLT4960   1423 546   12430a17553633N110441988E   154484   163624    997917070258
CLT4960   14231423   12440a17554332N110441557E   154361   163841   1014919090420
CLT4960   14231423   12450a17555022N110441109E   154234   164056   1102919090540
CLT4960   14231423   12460a17555706N110440652E   154104   164269   1098917070701
CLT4960   14231423   12470a17560386N110440186E   153971   164481   1070927090824
CLT4960   14231423   12480a17561064N110435719E   153838   164692   1111927090948
CLT4960   14231423   12490a17561750N110435272E   153711   164905   1247927071113
CLT4960   14231423   12500a17562454N110434840E   153588   165124   1310927071238
CLT4960   14231423   12510a17563157N110434409E   153465   165343   1307927071402
CLT4960   14231423   12520a17563853N110433972E   153341   165560   1196927071530
CLT4960   14231423   12530a17564548N110433538E   153218   165776    994927071754
11111111   22223333   44444566666666666666666666   777777   888888   9999000000000   111
A          I   I     I   API                      I        I        I   I            I
```

At this point we have determined the layout of the data record. There are 11 fields, each with a known content, this pattern allows us to identify the file as a known format, or if not, to read it's contents. All other records are then treated as headers.

Appendix D—Example Format for Describing Known Data Record Formats

Description of Record Formats Database

Record N   - name of format
Record F   - character used to select data records
           ' ' no flag present
           '*' use only records with a blank in column 1
           'S' shot record
           'R' receiver
           '?' all other alpha characters valid

```
N SEG_P1
F
1,1,1
2,17,1
18,25,3
26,26,1
27,35,−5
36,45,−6
46,53,80
54,61,80
62,66,50
67,68,3
69,71,3
72,73,3
74,75,3
76,77,3
N SEG_P3
1,17,1
18,33,1
34,35,1
36,36,3
37,44,80
```

-continued

```
45,51,70
52,59,80
60,64,50
65,80,1
N UK00A_P1-S
F S
2,13,1
17,17,1
18,18,1
19,19,1
20,25,1
26,46,-7
47,55,91
56,64,91
65,70,61
71,73,3
74,79,6
N SEG_SPS-S
F S
2,11,102
12,21,102
24,24,3
25,26,1
27,30,3
31,34,41
35,38,3
39,40,3
41,46,61
47,55,91
56,65,101
66,71,61
72,74,3
75,80,3
```

Appendix E—Example Format for Describing Keyword Control File

The following is an example format for a control file describing keywords and values which may be assigned to the keywords.

The first field is the type of choices that can be assigned to the keyword.

LIST implies only specific choices are valid. The specific choices are defined in a file with a name derived from first keyword listed. Included with each choice is a maximum allowed error count.

ALPHA allows any text string to be assigned. No embedded blanks may be present unless inside quotes or part of an explicit assignment.

Commas are used to separate fields. i.e., both of the following are OK:

ZONE=west texas,
ZONE="west texas"

NUMBER allows numeric values only to be assigned, with or without a decimal point.

The second field is the primary name of the keyword.

Fields 3-n contain aliases of the keyword to be recognized as the same.

All text strings containing most of the same characters in the same order are also considered an alias.

Keywords can be defined with multiple forms. An example is the ZONE keyword in Appendix A.

The system may try each entry in the control file until a value is found.

The entries may be always compared in the order LIST first, NUMBER second, and ALPHA third.

The following is an example control file in the above format.

```
LIST,SPHEROID,ellipsoid,sphere
LIST,DATUM
LIST,ZONE,zonename
NUMBER,ZONE
ALPHA,ZONE,Zonename
LIST,PROJECTION
NUMBER,Meridian
NUMBER,Latitude
NUMBER,Easting
NUMBER,Northing
NUMBER,Scale
LIST,REGION
LIST,COUNTRY
LIST,STATE
LIST,PROVINCE
....etc...
```

Appendix F—Keyword Matching Algorithm Specifications

The purpose of the algorithm is to match a string from a header record to a keyword string.

This is done by building a list of possible matches between input header words and predefined keywords, as follows:

Each entry in the list contains:
A character string
A number of errors
The index of the next character position in the input string
The index of the next "match" character position in the keyword string Initialize a list with one entry.
The initial entry contains a null character string
The initial next index of the incoming string set to "1"
The initial next "match" position in the keyword string is set to "1"

Then for each entry in the list or input strings:
If the character at the next index in the input string matches the character at the next index from a keyword string, then add it to the entry character string and advance the input string's "next" index by one and add one to the keyword string "match" counter.

If there is no match, then modify the input entry by adding the correct character from the keyword string. Do this by adding three possible entries to the list as follows:

Add an entry that acts as if a character from the keyword string needs to be inserted into the input string in order to match. Do not change the "next" index. Add one to the "match" counter. Add another entry corresponding to each previous to the list.

Add an entry that acts as if a character needs to be replaced in the input string in order to match the keyword string. Add one to the "error" counter. Add the correct character to the input string, like a replace. Add 1 to "next" index. Add one to the "match" counter. Add another entry corresponding to each previous to the list.

Add an entry that acts as if a character needs to be skipped from the input string in order to match the keyword string. Do not add a character, like a skip. Add one to the "error" counter. Add 1 to the "next" index. Do not increment the "match" counter. Add another entry corresponding to each previous to the list.

Repeat until the "next" index value or the "match" counter or the "error" counter exceed the limits assigned to them.

Choose the entry with fewest errors, if the error count is less than the maximum allowed and call it a match!

The invention claimed is:

1. A method of geodetic information acquisition comprising:
    identifying a file, the file comprising a plurality of records, the plurality of records comprising spatially referenced data in an unknown format;
    classifying each of the plurality of records as either free-form or fixed format;
    classifying the plurality of records into one or more header records and one or more data records;
    dividing each of the plurality of records into a plurality of fields;
    for any of the one or more data records classified as fixed format:
        deriving, from the one or more data records classified as fixed format, one or more patterns of fields consistent with one or more sets of the one or more data records;
        determining if the plurality of records classified as fixed format matches a known format based on the one or more patterns of fields; and
        if the plurality of records classified as fixed format matches a known format, extracting at least some of the spatially referenced data from the plurality of records in accordance with the known format;
    identifying one or more keyword fields in the plurality of records by comparing the fields of the plurality of records to a list of possible keyword fields;
    matching each of the one or more keyword fields to a value field for that keyword; and
    updating a database to store each matching of the one or more keyword fields to a value field for that keyword.

2. The method of claim 1, further comprising associating the spatially referenced data with a coordinate reference system.

3. The method of claim 2, wherein the coordinate reference system is determined based on a second file comprising spatially referenced data.

4. The method of claim 2, wherein the spatially referenced data is associated with the coordinate reference system based on user input.

5. The method of claim 1, further comprising converting the spatially referenced data to a different coordinate system.

6. The method of claim 1, further comprising converting the spatially referenced data to a different format.

7. The method of claim 1, further comprising identifying one or more keywords in the one or more header records.

8. The method of claim 7, further comprising:
    identifying one or more values in the one or more header records; and
    associating each of the one or more keywords with one of the one or more values.

9. The method of claim 1, further comprising:
    determining a pattern in the one or more patterns of fields could be modified to be consistent with additional data records in the one or more data records; and
    modifying the pattern to be consistent with the additional data records.

10. The method of claim 1, wherein the spatially referenced data identifies a feature of a geographical location.

11. The method of claim 1, further comprising creating a map showing at least one location identified by the spatially referenced data.

12. The method of claim 1, further comprising creating a map showing locations identified by the spatially referenced data.

13. The method of claim 1, further comprising dividing the plurality of records into one or more stanzas, each stanza comprising a plurality of data records having the same format.

14. The method of claim 1, further comprising determining if a set of data records comprises fields which are fixed in length.

15. The method of claim 1, further comprising determining if a set of data records comprises fields which are not fixed in length.

16. The method of claim 1, further comprising storing the extracted spatially referenced data in an index.

17. The method of claim 16, further comprising querying the index.

18. A computer program product for geodetic information acquisition embodied on a non-transitory computer readable medium, the computer program product comprising:
    computer code for identifying a file, the file comprising a plurality of records, the plurality of records comprising spatially referenced data in an unknown format;
    computer code for classifying each of the plurality of records as either free-form or fixed format;
    computer code for classifying the plurality of records into one or more header records and one or more data records;
    computer code for dividing each of the plurality of records into a plurality of fields;
    for any of the one or more data records classified as fixed format, computer code for:
        deriving, from the one or more data records classified as fixed format, one or more patterns of fields consistent with one or more sets of the one or more data records;
        determining if the plurality of records classified as fixed format matches a known format based on the one or more patterns of fields; and
        if the plurality of records classified as fixed format matches a known format, extracting at least some of the spatially referenced data from the plurality of records in accordance with the known format;
    computer code for identifying one or more keyword fields in the plurality of records by comparing the fields of the plurality of records to a list of possible keyword fields;
    computer code for matching each of the one or more keyword fields to a value field for that keyword; and
    computer code for updating a database to store each matching of the one or more keyword fields to a value field for that keyword.

19. The computer program product of claim 18, further comprising computer code for associating the spatially referenced data with a coordinate reference system.

20. The computer program product of claim 19, wherein the coordinate reference system is determined based on a second file comprising spatially referenced data.

21. The computer program product of claim 19, wherein the spatially referenced data is associated with the coordinate reference system based on user input.

22. The computer program product of claim 18, further comprising computer code for converting the spatially referenced data to a different coordinate system.

23. The computer program product of claim 18, further comprising computer code for converting the spatially referenced data to a different format.

24. The computer program product of claim 18, further comprising computer code for identifying one or more keywords in the one or more header records.

25. The computer program product of claim 24, further comprising:
   computer code for identifying one or more values in the one or more header records; and
   computer code for associating each of the one or more keywords with one of the one or more values.

26. The computer program product of claim 18, further comprising:
   computer code for determining a pattern in the one or more patterns of fields could be modified to be consistent with additional data records in the one or more data records; and
   computer code for modifying the pattern to be consistent with the additional data records.

27. The computer program product of claim 18, wherein the spatially referenced data identifies a feature of a geographical location.

28. The computer program product of claim 18, further comprising computer code for creating a map showing at least one location identified by the spatially referenced data.

29. The computer program product of claim 18, further comprising computer code for creating a map showing locations identified by the spatially referenced data.

30. The computer program product of claim 18, further comprising computer code for dividing the plurality of records into one or more stanzas, each stanza comprising a plurality of data records having the same format.

31. The computer program product of claim 18, further comprising computer code for determining if a set of data records comprises fields which are fixed in length.

32. The computer program product of claim 18, further comprising computer code for determining if a set of data records comprises fields which are not fixed in length.

33. The computer program product of claim 18, further comprising computer code for storing the extracted spatially referenced data in an index.

34. The computer program product of claim 33, further comprising computer code for querying the index.

35. The method of claim 1, wherein the associating the plurality of records with a known format further comprises:
   forming a template from at least some of the one or more patterns of fields;
   comparing the formed template to a database of templates, each template in the database of templates associated with a known format;
   matching the formed template to a matching template in the database of templates; and
   associating the plurality of records with the known format associated with the matching template.

* * * * *